US010091621B2

(12) United States Patent
Sonoda

(10) Patent No.: US 10,091,621 B2
(45) Date of Patent: Oct. 2, 2018

(54) METHOD FOR DEPLOYMENT, DEPLOYMENT DESTINATION IDENTIFICATION PROGRAM, AND DEPLOYMENT SYSTEM

(71) Applicant: FUJITSU LIMITED, Kawasaki-shi, Kanagawa (JP)

(72) Inventor: Masataka Sonoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 15/206,376

(22) Filed: Jul. 11, 2016

(65) Prior Publication Data

US 2017/0064597 A1    Mar. 2, 2017

(30) Foreign Application Priority Data

Aug. 28, 2015 (JP) ................................ 2015-169207

(51) Int. Cl.
H04W 36/12 (2009.01)
H04W 4/02 (2018.01)
H04W 36/24 (2009.01)
H04W 36/32 (2009.01)
H04W 4/029 (2018.01)

(52) U.S. Cl.
CPC ......... *H04W 4/027* (2013.01); *H04W 36/245* (2013.01); *H04W 4/029* (2018.02); *H04W 36/32* (2013.01)

(58) Field of Classification Search
None
See application file for complete search history.

(56) References Cited

U.S. PATENT DOCUMENTS

2009/0260005 A1* 10/2009 Nakagawa .......... H04L 67/1095
717/177
2010/0020764 A1* 1/2010 Yamamoto .......... H04W 36/245
370/331
2010/0235432 A1* 9/2010 Trojer ................. H04L 12/2861
709/203

FOREIGN PATENT DOCUMENTS

| JP | 2004-056255 | 2/2004 |
| JP | 2009-252075 | 10/2009 |
| JP | 2010-502097 | 1/2010 |
| JP | 2011-070316 | 4/2011 |
| WO | 2008/024037 | 2/2008 |

* cited by examiner

Primary Examiner — Vinncelas Louis
(74) Attorney, Agent, or Firm — Fujitsu Patent Center

(57) ABSTRACT

A method for deployment, the method includes acquiring a history of stay time of a terminal which stayed in a provision domain that each of plurality of information processing devices provides the service from the each of plurality of the information processing devices that provides the service to the terminal, deciding, depending on a movement of a first terminal, the information processing device, which provides the service to the first terminal, among a plurality of information processing devices that the first terminal is located in the provision domain, based on a communication time about the communication with the terminal and a ratio at a shift time, which needs for a shift of the information about the service between the information processing devices, for the stay time of the provision domain that the first terminal is located that is acquired based on the history of the stay time.

17 Claims, 29 Drawing Sheets

| TIME | USER ID | EVENT | SERVER |
|---|---|---|---|
| 2014.12.21 12:20 | u1 | user_in | e001 |
| 2014.12.21 12:30 | u1 | user_out | e001 |
| 2014.12.21 12:30 | u1 | user_in | e002 |
| 2014.12.21 12:37 | u1 | user_out | e002 |
| 2014.12.21 12:37 | u1 | user_in | e003 |
| 2014.12.21 12:40 | u2 | user_in | e003 |
| 2014.12.21 12:46 | u1 | user_out | e003 |
| 2014.12.21 12:46 | u2 | user_in | e006 |
| 2014.12.21 12:52 | u2 | user_out | e003 |
| 2014.12.21 12:52 | u2 | user_in | e006 |
| 2014.12.21 13:06 | u2 | user_out | e006 |
| 2014.12.21 13:06 | u2 | user_in | e009 |
| 2014.12.21 13:20 | u2 | user_out | e009 |
| 2014.12.21 13:20 | u2 | user_in | e013 |

| TIME | APPLICATION ID | EVENT | SERVER |
|---|---|---|---|
| 2014.12.21 12:52 | a2 | migrate_start | e003 |
| 2014.12.21 12:56 | a2 | migrate_end | e006 |
| 2014.12.21 13:06 | a2 | migrate_start | e006 |
| 2014.12.21 13:09 | a2 | migrate_end | e009 |

| POSITION INFORMATION | ENTRY TIME | LEAVING TIME | STAY TIME |
|---|---|---|---|
| Ee001 | 2014.12.21 12:20 | 2014.12.21 12:30 | 00:10 |
| Ee002 | 2014.12.21 12:30 | 2014.12.21 12:37 | 00:07 |
| Ee003 | 2014.12.21 12:37 | 2014.12.21 12:46 | 00:09 |
| Ee006 | 2014.12.21 12:46 | | |

| POSITION INFORMATION | ENTRY TIME | LEAVING TIME | STAY TIME |
|---|---|---|---|
| Ee003 | 2014.12.21 12:40 | 2014.12.21 12:52 | 00:12 |
| Ee006 | 2014.12.21 12:52 | 2014.12.21 13:06 | 00:14 |
| Ee009 | 2014.12.21 13:06 | 2014.12.21 13:20 | 00:14 |
| Ee013 | 2014.12.21 13:20 | | |

| APPLICATION ID | SHIFT ORIGIN | SHIFT DESTINATION | START TIME | END TIME | SHIFT TIME |
|---|---|---|---|---|---|
| a1 | e001 | e002 | 2014.12.21 12:30 | 2014.12.21 12:33 | 00:03 |
| a1 | e002 | e003 | 2014.12.21 12:37 | 2014.12.21 12:41 | 00:04 |

| APPLICATION ID | SHIFT ORIGIN | SHIFT DESTINATION | START TIME | END TIME | SHIFT TIME |
|---|---|---|---|---|---|
| a2 | e003 | e006 | 2014.12.21 12:52 | 2014.12.21 12:56 | 00:04 |
| a2 | e006 | e009 | 2014.12.21 13:06 | 2014.12.21 13:09 | 00:03 |

FIG.13

| LINK | TERMINAL POINT 1 | TERMINAL POINT 2 | COMMUNICATION DELAY [ms] |
|---|---|---|---|
| ln001 | term | e001 | 10 |
| ... | ... | ... | ... |
| ln003 | term | e003 | 10 |
| ... | ... | ... | ... |
| ln006 | term | e006 | 10 |
| ... | ... | ... | ... |
| ln101 | e001 | lm001 | 10 |
| ... | ... | ... | ... |
| ln106 | e006 | lm001 | 10 |
| ... | ... | ... | ... |
| ln201 | lm001 | um001 | 20 |
| ... | ... | ... | ... |

TI3

| USER ID | APPLICATION ID | DEPLOYMENT LAYER | SPECULATION DEPLOYMENT AREA |
|---|---|---|---|
| u1 | a1 | LOWER MIDDLE | Elm001 |
| u2 | a2 | EDGE | Ee004, Ee006, Ee007, Ee008, Ee009, Ee012, Ee013 |
| ... | | | ... |

FIG.15

| SERVER | HIGHER SERVE | LOWER SERVER | NEIGHBORING COVER AREA | DEPLOYMENT APPLICATION |
|---|---|---|---|---|
| e001 | [lm001] | [] | [Ee002, Ee004, Ee005] | [] |
| e002 | [lm001] | ... | [Ee001, Ee003, Ee004, Ee005, Ee006] | [a1] |
| ... | ... | ... | ... | [] |
| e005 | [lm001] | [] | [Ee001, Ee002, Ee003, Ee004, Ee006, Ee007, Ee001, Ee003, Ee005] | [a1] |
| ... | ... | ... | ... | ... |
| e009 | [lm001] | [] | [Ee005, Ee006, Ee008, Ee012, Ee013] | [a1] |
| e011 | [lm002] | [] | [Ee007, Ee008, Ee012, Ee014, Ee015] | [] |
| lm001 | [um001] | [e001, e002, ..., e009] | [Elm002] | [a2] |
| lm002 | [um001] | [e011, ...] | [Elm001] | [] |
| um001 | [c1] | [lm001, lm002, ...] | [Elm002] | [] |
| c1 | - | [um001, ...] | [] | [] |

| SERVER | HIGHER SERVE | LOWER SERVER | NEIGHBORING COVER AREA | DEPLOYMENT APPLICATION |
|---|---|---|---|---|
| e001 | [lm001] | □ | [Ee002, Ee004, Ee005] | □ |
| e002 | [lm001] | □ | [Ee001, Ee003, Ee004, Ee005, Ee006] | □ |
| e003 | [lm001] | □ | ... | □ |
| e004 | [lm001] | □ | [Ee001, Ee002, Ee003, Ee004, Ee006, Ee007, Ee001, Ee003, Ee005] | □ |
| e005 | [lm001] | □ | ... | □ |
| e006 | [lm001] | □ | [Ee005, Ee006, Ee008, Ee012, Ee013] | □ |
| e007 | [lm001] | □ | [Ee007, Ee008, Ee012, Ee014, Ee015] | □ |
| e008 | [lm001] | □ | ... | □ |
| e009 | [lm001] | [e001, e002, ..., e009] | [Elm002] | □ |
| e011 | [lm002] | ... | [Elm001] | ... |
| e012 | [lm002] | [e011, ...] | ... | □ |
| e013 | [lm002] | □ | [Elm002] | □ |
| ... | ... | ... | ... | ... |
| lm001 | [um001] | [lm001, lm002, ...] | □ | □ |
| lm002 | [um001] | ... | NEIGHBORING COVER AREA | ... |
| ... | ... | ... | [Ee002, Ee004, Ee005] | |
| um001 | [c1] | [um001, ...] | [Ee001, Ee003, Ee004, Ee005, Ee006] | □ |
| c1 | - | □ | [Ee001, Ee002, Ee003, Ee004, Ee006, Ee007, Ee001, Ee003, Ee005] | □ |
| e001 | [lm001] | □ | | □ |

| SERVER | HIGHER SERVE | LOWER SERVER | NEIGHBORING COVER AREA | DEPLOYMENT APPLICATION |
|---|---|---|---|---|
| e001 | [lm001] | □ | [e002, e004, e005] | □ |
| e002 | [lm001] | □ | [e001, e003, e004, e005, e006] | □ |
| e003 | [lm001] | □ | ... | [a2] |
| e004 | [lm001] | □ | [e001, e002, e003, e004, e006, e007, e001, e003, e005] | □ |
| e005 | [lm001] | □ | | □ |
| e006 | [lm001] | □ | ... | [a2] |
| e007 | [lm001] | □ | [e005, e006, e008, e012, e013] | □ |
| e008 | [lm001] | □ | | [a2] |
| e009 | [lm001] | □ | [e007, e008, e012, e014, e015] | [a2] |
| e011 | [lm002] | □ | | [a2] |
| e012 | [lm002] | □ | ... | □ |
| e013 | [lm002] | □ | ... | □ |
| ... | ... | ... | ... | ... |
| lm001 | [um001] | [e001, e002, ..., e009] | ... | [a1] |
| lm002 | [um001] | [e011, ...] | [lm002] | □ |
| ... | ... | ... | ... | ... |
| um001 | [c1] | [lm001, lm002, ...] | [lm002] | □ |
| ... | ... | ... | ... | ... |
| c1 | - | [um001, ...] | | □ |

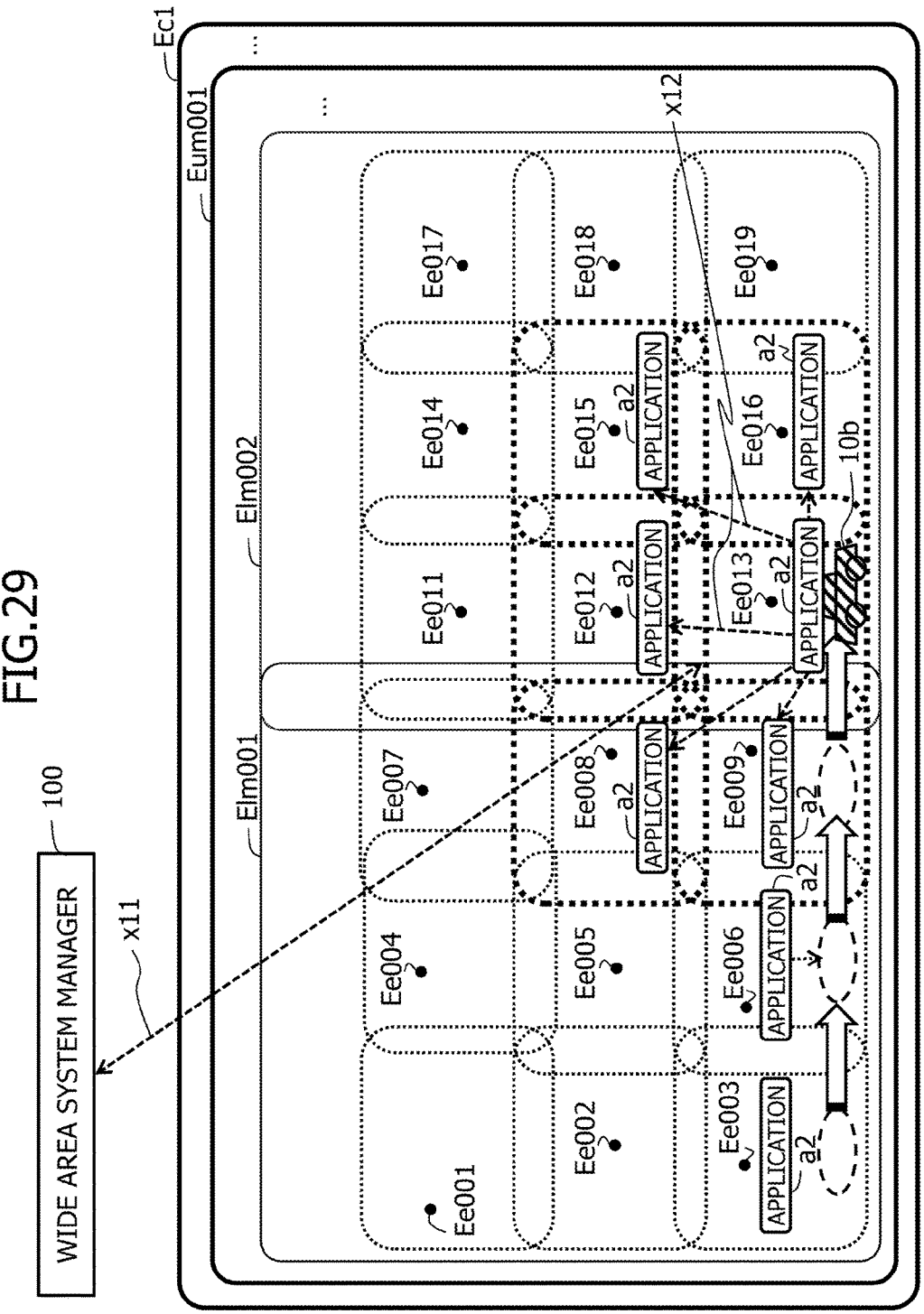

METHOD FOR DEPLOYMENT, DEPLOYMENT DESTINATION IDENTIFICATION PROGRAM, AND DEPLOYMENT SYSTEM

CROSS-REFERENCE TO RELATED APPLICATION

This application is based upon and claims the benefit of priority of the prior Japanese Patent Application No. 2015-169207, filed on Aug. 28, 2015, the entire contents of which are incorporated herein by reference.

FIELD

The embodiments discussed herein are related to a method for deployment, a deployment destination identification program and a deployment system.

BACKGROUND

There is information system which distributes servers (information processing device) providing service to a terminal in wide area. The server provides the service for a terminal located in a domain (also called as cover area) where the server targets for the offer of the service. In the information system, for example, an edge server located in a short distance from the terminal provides service to the terminal concerned. In this way, response time of the communication processing makes shorten.

When the terminal moves and comes in the cover area of a second edge server which is different from the first edge server which provided service to the terminal, an edge server providing the service to the terminal is changed. The server providing the service to the terminal deploys the information (called as service information) about the service to use when providing the service to the terminal. Therefore, shift processing of the service information occurs when the server providing the service to the terminal changes.

For example, patent documents 1 and 2 disclose the information system which has a plurality of information processing devices and carries out processing about the moving terminal.

CITATION LIST

Patent Document

[Patent document 1] Japanese Laid-Open Patent Publication No. 2004-056255

[Patent document 2] Japanese Laid-Open Patent Publication No. 2009-252075

SUMMARY

However, a movement speed of the terminal is not same. When the terminal moves fast, the shift processing occurs frequently. At a time when the shift processing is completed, the terminal may leave the cover area of the edge server which completed the shift processing, and the shift processing may produce again. Because the terminal is not able to catch the provision of the service during the shift processing, a waiting time for a response becomes long.

On the other hand, there is another form that a center server, which connects to the terminal via the plurality of servers, provides the service to the terminal. When the central server provides the service, either server located in the course to the central server may maintain the service information. However, response time of the communication processing with the terminal and the central server becomes longer because of way of plural servers.

In this way, when the edge server located at the short distance from the terminal provides the service, the waiting time for a response based on the shift processing may become longer when the terminal moves fast although the response time of the communication processing makes shorten. Therefore, it is not easy to decide a server of deployment ahead of the service information which provides the service to the terminal so as to satisfy the reply permission time for the service.

According to an aspect of the embodiments, a deployment method, the method includes acquiring a history of stay time of a terminal which stayed in a provision domain that each of plurality of information processing devices provides the service from the each of plurality of the information processing devices that provides the service to the terminal, deciding, depending on a movement of a first terminal, the information processing device, which provides the service to the first terminal, among a plurality of information processing devices that the first terminal is located in the provision domain, based on a communication time about the communication with the terminal and a ratio at a shift time, which needs for a shift of the information about the service between the information processing devices, for the stay time of the provision domain that the first terminal is located that is acquired based on the history of the stay time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram indicating an example of user movement log information Ht1.

FIG. 8 is a diagram indicating an example of application shift log information Ht2.

FIG. 9A and FIG. 9B are diagrams indicating an example of stay history information for each user Ht3.

FIG. 10A and FIG. 10B are diagrams indicating an example of shift history information for each application Ht4.

FIG. 13 is a diagram indicating an example of network link information TI3.

FIG. 15 is a diagram indicating an example of server topology information TI5.

FIG. 22 is a diagram indicating an example of server topology information TI5-1 in the embodiment.

FIG. 26 is a diagram indicating an example of server topology information TI5-2 in the example.

FIG. 29 is a diagram explaining the second update example of the user information TI1.

DESCRIPTION OF EMBODIMENTS

Embodiments will be described hereinafter according to the drawings. However, it is noted that the technical scope is not limited to the embodiments described below, but covers the matters described in the claims and the equivalents thereof.

[Wide Area Distributed System]

Figure 1:
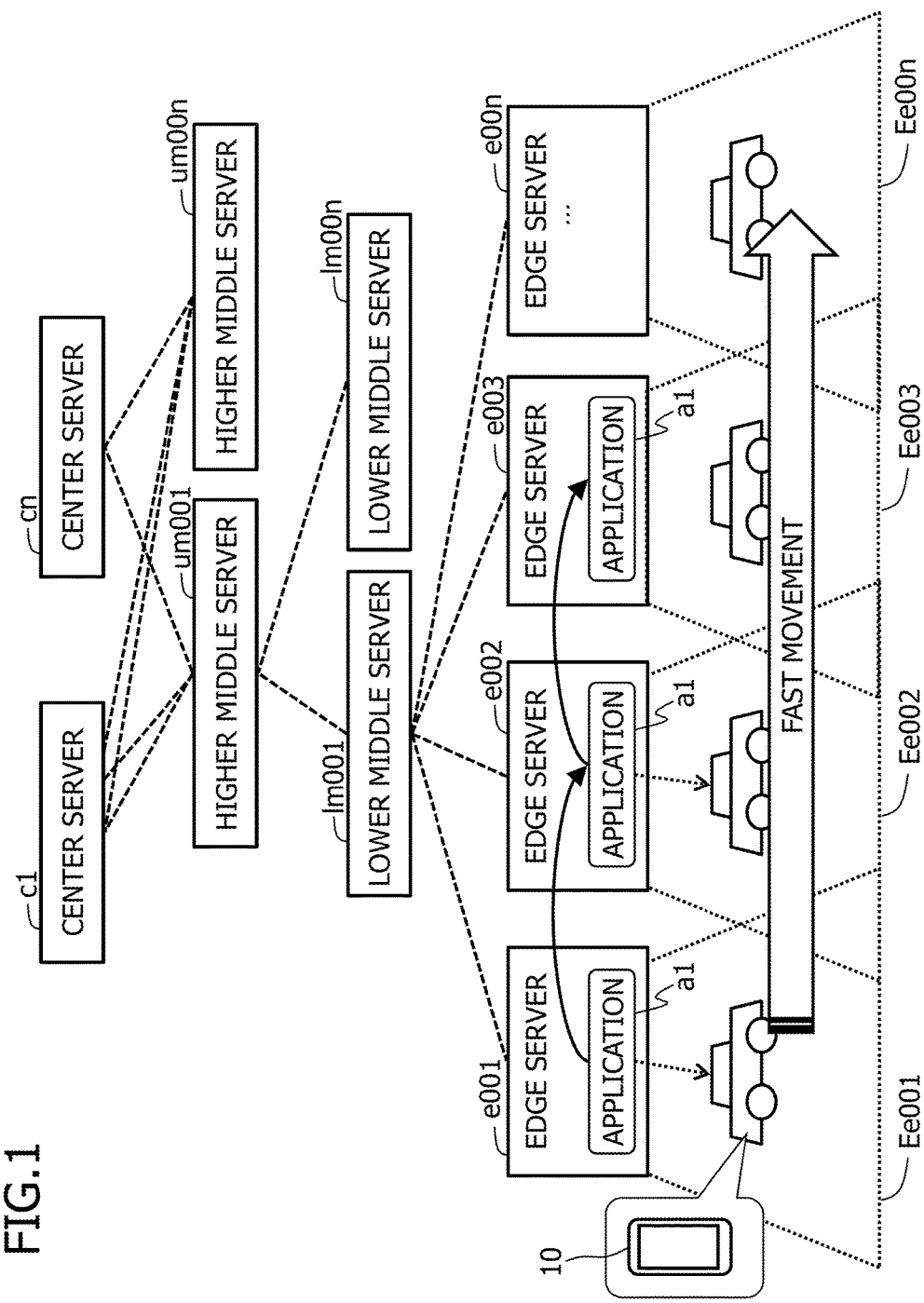
FIG. 1 is a diagram indicating an example of the wide area distributed system according to the embodiment.

FIG. 1 is a diagram indicating an example of the wide area distributed system according to the embodiment. The wide area distributed system represents system which distributes the servers (information processing device) to provide the service to the terminal 10 in the wide area. In the wide area distributed system, each server located in the wide area provides the service to the terminal 10.

The wide area distributed system depicted in FIG. 1 has the plurality of servers belonging to either of the plurality of hierarchies (also called as layer as follows). The plurality of servers depicted in FIG. 1 include center servers "c1"-"cn", higher middle servers "um001"-"um00n", lower middle servers "lm001"-"lm00n", edge servers "e001"-"e00n".

As follows, the center server "c1"-"cn", the higher middle servers "um001"-"um00n", the lower middle servers "lm001"-"lm00n", and the edge servers "e001"-"e00n" are also described as the server. In addition, the center servers "c1"-"cn" are also described as center server "cx". In addition, the higher middle servers "um001"-"um00n" are also described as higher middle server "um00x". In addition, the lower middle servers "lm001"-"lm00n" are described as lower middle server "lm00x". In addition, the edge servers "e001"-"e00n" are also described as edge server "e00x".

The center server "c1x" depicted in FIG. 1 is a server belonging to a top layer, and the higher middle server "um00x" is a server belonging to the higher middle layer under one of the top layer. In addition, the lower middle server "lm00x" depicted in FIG. 1 is a server belonging to a lower middle layer under one of the higher middle layers, and the edge server "e00x" is a server belonging to the edge layer of the bottom layer under one of the lower middle layers.

In the embodiment, for example, the center server "cx" is a server located in the data center of metropolitan areas, and the higher middle server "um00x" is a server located in the data centers of each prefecture. In addition, for example, the lower middle server "lm00x" is a server located in the data center of cities, towns and villages, and the edge server "e00x" is a base station.

Each server described above provides the service for the terminal 10 through communication by carrying out the application "a1". For example, each server provides the service by transmitting a processing result of the application "a1" to the terminal 10. In addition, for example, each server provides service by receiving input information from the terminal 10, and carrying out processing of the application "a1" based on the input information.

The application "a1" according to the embodiment indicates a program to provide predetermined service to the terminal 10 through the communication. For example, the application "a1" indicates the game or programs such as the transmission and reception of the file and the downloading of the information depending to a position of the terminal 10.

In addition, the terminal 10 according to the embodiment is constructed by a movable communication device. FIG. 1 exemplifies a case that a user with the terminal 10 moves on the movement vehicles such as a car or the train. For example, the terminal 10 is constructed by the communication equipment such as a smart-phone, a tablet terminal, a personal computer, and a game device.

(Communication Time)

In a wide area distributed system depicted in FIG. 1, each edge servers "e001"-"e00n" connects with the terminal 10 through the wireless communication. In addition, the lower middle server "lm001" depicted in FIG. 1 is connected to the edge servers "e001"-"e00n" through a cable communication or a wireless communication and is connected to the terminal 10 via the edge servers "e001"-"e00n".

Similarly, the higher middle server "um001" is connected to the lower middle servers "lm001"-"lm00n" and the edge servers "e001"-"e00n" through the cable communication or the wireless communication and is connected to the terminal 10 via the edge servers "e001"-"e00n". The center server "c1" is connected to the higher middle servers "um001"-"um00n", the lower middle servers "lm001"-"lm00n" and the edge servers "e001"-"e00n" through the cable communication or the wireless communication and is connected to the terminal 10 via the edge servers "e001"-"e00n".

Therefore, a communication distance with the terminal 10 and the server belonging to a lower layer is shorter than the communication distance with the terminal 10 and the server belonging to a higher layer. Thereby, the communication time with the terminal 10 and the server belonging to the lower layer is shorter than the communication time with the terminal 10 and the server belonging to the higher layer.

Especially, the communication time with the edge server "e00x" and the terminal 10 is shorter than the communication time with the terminal 10 and the lower middle server "lm00x". Similarly, the communication time with the terminal 10 and the lower middle server "lm001" is shorter than the communication time with the higher middle server "um001" and the terminal 10.

The service has a rule of the reply performance (also called as demand reply performance) that the service requests. When the demand reply performance of the service is high, the influence on the reply performance of the communication time is large. Therefore, for example, the edge server "e00x" that the communication time with the terminal 10 has a short provides service to the terminal 10. Thereby, a delay (also called as communication delay) of the response time based on the communication time between the terminal 10 and the server providing the service decreases and it is possible to improve the reply performance of the service.

In addition, according to the wide area distributed system depicted in FIG. 1, the server (for example, lower middle server "lm001") belonging to a higher layer uses a server (for example, edge server "e001") belonging to a lower layer as a broadcast device in the communication with the terminal 10. But it is not a thing limited to this example. The server belonging to a higher layer may connect to the terminal 10 via the broadcast device provided separately. Even when the server is connected to the terminal 10 via the broadcast device provided separately, the communication time with the terminal 10 and the server belonging to a lower layer is shorter than the communication time with the terminal 10 and the server belonging to a higher layer.

(Cover Area)

Each edge servers "e001"-"e00n" has cover area "Ee001"-"Ee00n" depicted in the trapezoid by the dotted line in FIG. 1. The cover area "Ee001"-"Ee00n" is the domain where the edge servers "e001"-"e00n" are able to provide the service according to predetermined reply performance for the terminal 10. Each edge servers "e001"-"e00n" provides the service for the terminal 10 which located in the cover area "Ee001"-"Ee00n" of the edge servers "e001"-"e00n".

In addition, though not illustrated in FIG. 1, but the server (center server "cx", higher middle server "um00x", lower middle server "lm00x") except the edge server "e00x" have cover areas. The cover area of each server will be described according to FIG. 2.

Then, the shift processing of information about the service when the terminal 10 moved will be described according to FIG. 2.

[Shift Processing]

Figure 2:
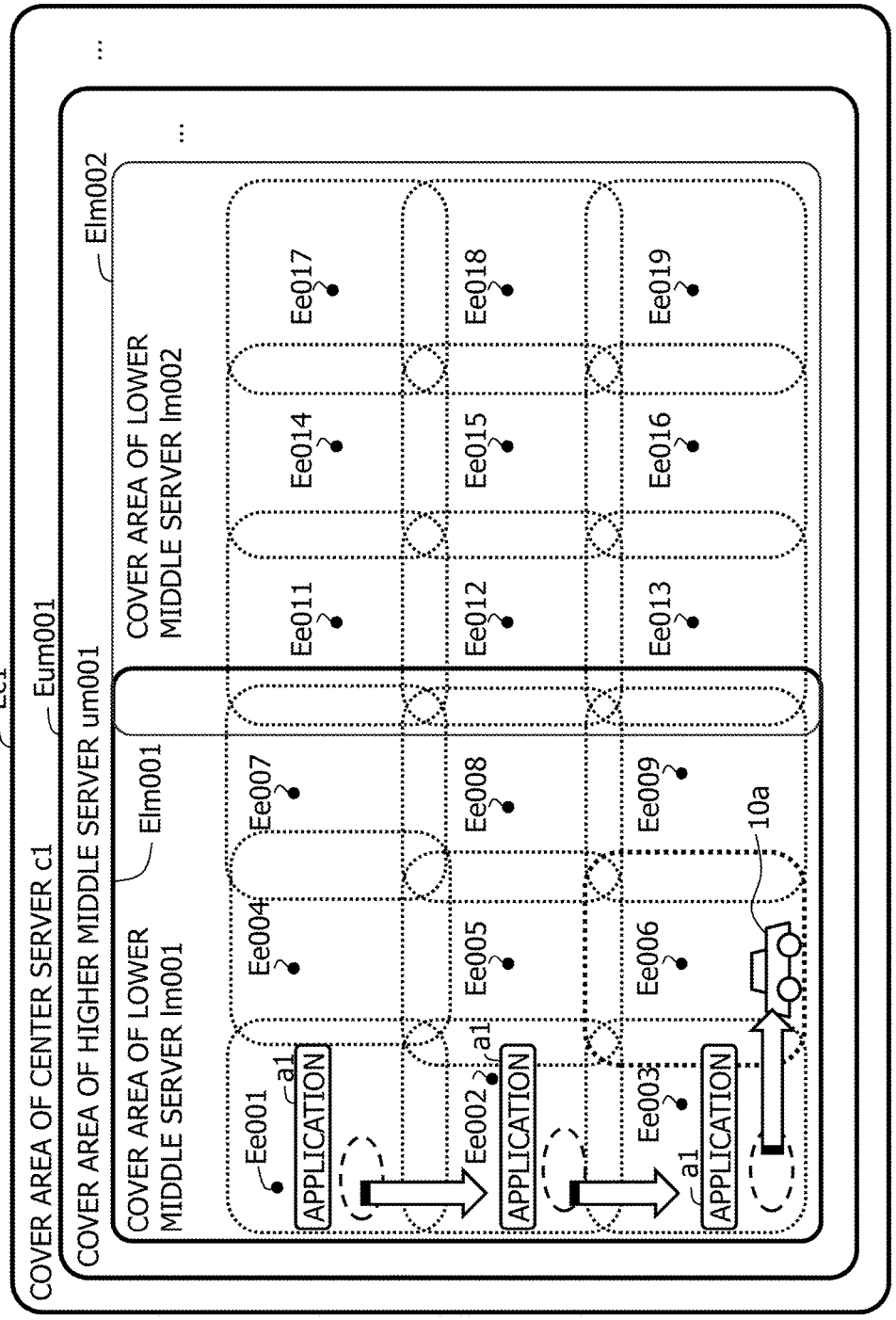
FIG. 2 is a diagram explaining the shift processing when the terminal 10 moved in the wide area distributed system depicted in FIG. 1.

FIG. 2 is a diagram explaining the shift processing when the terminal 10 moved in the wide area distributed system depicted in FIG. 1. In FIG. 2, same elements as that indicated by FIG. 1 are represented by same sign in FIG. 1. FIG. 2 exemplifies a case that the terminal 10a moves and enters the cover area "Ee006".

FIG. 2 illustrates the cover area of various servers schematically. An area "Ee001" depicted in FIG. 2 is a cover area of the edge server "e001" (referring to FIG. 1). Similarly, areas "Ee002" and "Ee003" are cover areas of the edge servers "e002", "e003" (referring to FIG. 1) each. Other area "Ee004" . . . "Ee019" are cover areas of the edge servers "e004"-"e019" (not illustrated in FIG. 1) each.

In addition, an area "Elm001" depicted in FIG. 2 is a cover area of the lower middle server "lm001" (referring to FIG. 1), and an area "Elm002" is a cover area of the lower middle server "lm002" (not illustrated in FIG. 1). In addition, an area "Eum001" is a cover area of the higher middle server "um001" (referring to FIG. 1), and an area "Ec1" is a cover area of the center server "c1" (referring to FIG. 1).

According to the example of FIG. 2, the cover area "Elm001" of the lower middle server "lm001" corresponds with the cover area "Ee001" . . . "Ee009" of the edge server "e001"-"e009" which connect to the lower middle server "lm001". Similarly, the cover area "Eum001" of the higher middle server um001 corresponds with the cover area "Elm001" . . . "Elm00n" (not illustrated in FIG. 2) of the lower middle servers "lm001"-"lm00n" which connect to the higher middle server "um001".

Similarly, the cover area "Ec1" of the center server "c1" corresponds with the cover area "Eum001" . . . "Eum00n" (not illustrate in FIG. 2) of the higher middle servers "um001"-"um00n" which connect to the center server "c1".

In this way, the cover area of the server belonging to a higher layer corresponds with the cover area of a plurality of servers belonging to a lower layer which connects to the server concerned. Therefore, the cover area of the server belonging to the higher layer is wider than the cover area of the server belonging to the lower layer as indicated by the example of FIG. 2.

The response performance of the service in the terminal 10a decreases as the terminal 10 leaves the cover area of the server which provides the service. Therefore, when the terminal 10a moved and entered into another cover area, the terminal 10a receives the offer of the service from the server of another cover area. In other words, the server which offers the service to the terminal 10a is changed.

According to the change of the server providing service, the shift processing of the information (also called as service information) about the service, which is used when the service is provided to the terminal 10a, between the servers, produces. The service information indicates the programs of application a1 and the user state information that the application a1 use, for example.

The shift processing of service information is an installation processing of application a1 and a start processing of application a1 and a copying processing of the user state information that the application a1 uses, for example. The user state information is, for example, progress of the processing of application a1, account information of the user, the security information of the user and the data of the user, for example.

The content of the service is different depending on the terminal 10. Therefore, when each server is installed the application of all services that a wide area distributed system depicted in FIG. 1 provides, the capacity of the area of each server is compressed. Therefore, for example, each server is installed only application a1 of the service that the terminal 10a located in the cover area of the server concerned uses. In this case the server which provides the service to the terminal 10a newly may be installed the application a1 as the shift processing.

In addition, in the wide area distributed system, a plurality of servers continuously provides the service to the terminal 10a by switching the servers. Therefore, the server providing service to the terminal 10a shares the user state information about the terminal 10a by copying thereby realizing the continuous providing of the service. Therefore, the server processes a copy of the user state information as the shift processing even when the application a1 has already installed.

In this way, according to the change of the cover area where the terminal 10a is located, the shift processing of service information occurs. Because it is not possible that the server provides service to the terminal 10a in time band (called as shift time) which is carried out the shift processing, the terminal 10a becomes the response wait state of the service. Therefore, response waiting time of the service becomes longer.

As described above, the cover area of the edge server "e00x" is narrower than the cover area of the server belonging to the higher layer. Therefore, in a case that the edge server "e00x" provides the service to the terminal 10a, the frequency of the change of the cover area increases when the movement speed of the terminal 10a is fast. In this way, the response waiting time of the service (called as shift delay) becomes longer when the terminal 10a moved the cover area.

According to the example of FIG. 2, the terminal 10a enters the cover area "Ee006" through the cover areas "Ee001" . . . "Ee003". In an example of FIG. 2, the terminal 10a stays in each cover area "Ee001" . . . "Ee003" only for several minutes. Therefore, the shift processing for the edge server "e006" occurs during a short time after the shift processing for the edge server "e003" was completed. In addition, there may be occurred that the shift processing for the edge server "e006" is not completed during when the terminal 10a stays in the cover area "Ee006".

In this way, depending on the movement speed of the terminal 10a, response waiting time of the service of the terminal 10a increases, thereby the response performance decreases. The movement speed of the terminal 10a is not same and includes various speeds. Therefore, the response performance of the service may decrease when a shift delay is not considered.

On the other hand, when the lower middle server "lm001" belonging to a higher layer of the edge servers "e001"-"e003" and "e006" provides the service, a cover area is wide. Accordingly, the frequency of the shift processing reduces even if the terminal 10a moves fast. Therefore, a shift delay decreases and the response waiting time decreases. However, the communication time with the lower middle server "lm001" and the terminal 10a is longer than the communication time with the edge servers "e001"-"e003", "e006" and the terminal 10a. Therefore, the communication delays increase while the shift delay decreases.

In this way, the communication delay is in a relation of the trade-off with a shift delay when the terminal 10a moves. In addition, the shift delay fluctuates depending on the speed of the terminal 10a. Therefore, it is not easy to decide the server which provides the service to the terminal 10a where the moving speed is not same among the plurality of servers so as to satisfy the response permission time of the service.

Summary of Embodiment

Therefore, the wide area system manager according to the embodiment acquires a history of the stay time of the terminal 10 which stayed in the providing domain (cover area) where the server provides the service from each server (information processing device) providing the service to the terminal 10.

In addition, the wide area system manager decides a server providing service to the first terminal 10 from plurality of servers having a cover area (providing area) corresponding to the position of the first terminal 10 depending on the movement of the first terminal 10. The wide area system manager decides a server providing the service based on the communication time with the terminal 10a and a ratio at the shift time for the stay time of the cover area corresponding to a position of the first terminal 10 which is acquired based on the history.

The communication time with the terminal 10 is a time needed for the communication with the terminal 10. The shift time is a period needed for the shift processing of the service information between the servers. The service information is as same as mentioned above.

The communication time varies depending on the server. In addition, the stay time in the cover area varies depending on the movement speed of the terminal 10. When the movement speed of the terminal 10 is fast, the stay time shortens, and the ratio at the shift time for the stay time grows big. On the other hand, when the movement speed of terminal 10 is slow, the stay time gets longer, thereby the ratio at the shift time for the stay time becomes small.

Therefore, it is possible that the wide area system manager selects the server that the response waiting time is reduced based on the communication delay based on the different communication time depending on the server and the shift delay based on the ratio at shift time for the stay time which fluctuates depending on the movement speed of the terminal 10. Thereby, it is possible that the wide area system manager selects a server to satisfy the response permission time for service among the plurality of servers depending on the movement speed of the terminal 10.

In this way, when the movement speed of the terminal 10 in the system is not same, it is possible that the wide area system manager decides a server which is satisfied the response permission time for service from the plurality of servers as a server providing the service to the terminal 10 concerned.

Figure 3:
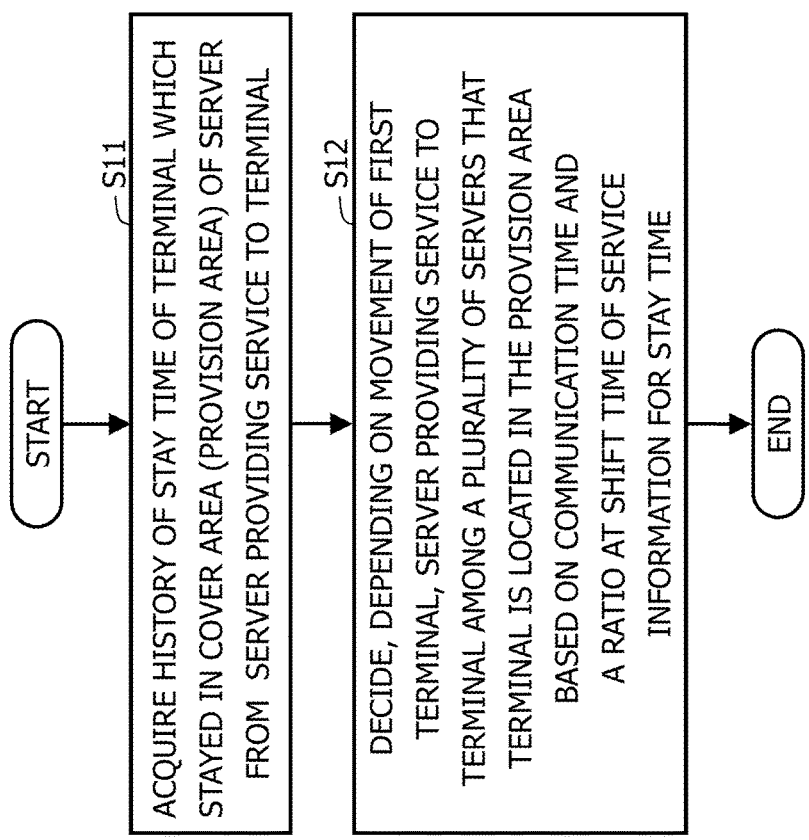
FIG. 3 is a diagram of flow chart explaining the processing of wide area system manager according to the embodiment.

FIG. 3 is a diagram of flow chart explaining the processing of wide area system manager according to the embodiment.

S11: The wide area system manager acquires a history of the stay time of the terminal 10 which stayed in the cover area of the server concerned from each server providing the service to the terminal 10. In other words, the wide area system manager acquires a history of the stay time of the terminal 10 in the cover area of the server concerned from each server depicted in FIG. 1.

S12: The wide area system manager decides a server providing the service to the terminal 10 based on the communication time and a ratio at the shift time for the stay time from the plurality of servers having a cover area corresponding to a position of the terminal 10 depending on the movement of the terminal 10.

According to the example of FIG. 2, the wide area system manager decides a server from a candidate server (the edge server "e006", the lower middle server "lm001", the higher middle server "um001", the center server "c1") having a cover area which is located a position of the terminal 10.

In addition, the wide area system manager acquires the stay time of the cover area where the terminal 10 is located every candidate server based on the history of the stay time which is acquired in the process S11. And the wide area system manager decides a server providing the service to the terminal 10a from the plurality of candidate servers based on the communication time with the terminal 10 and the ratio at the shift time for the stay time which is acquired for each candidate server.

(Decision Example of the Server)

Figure 4:
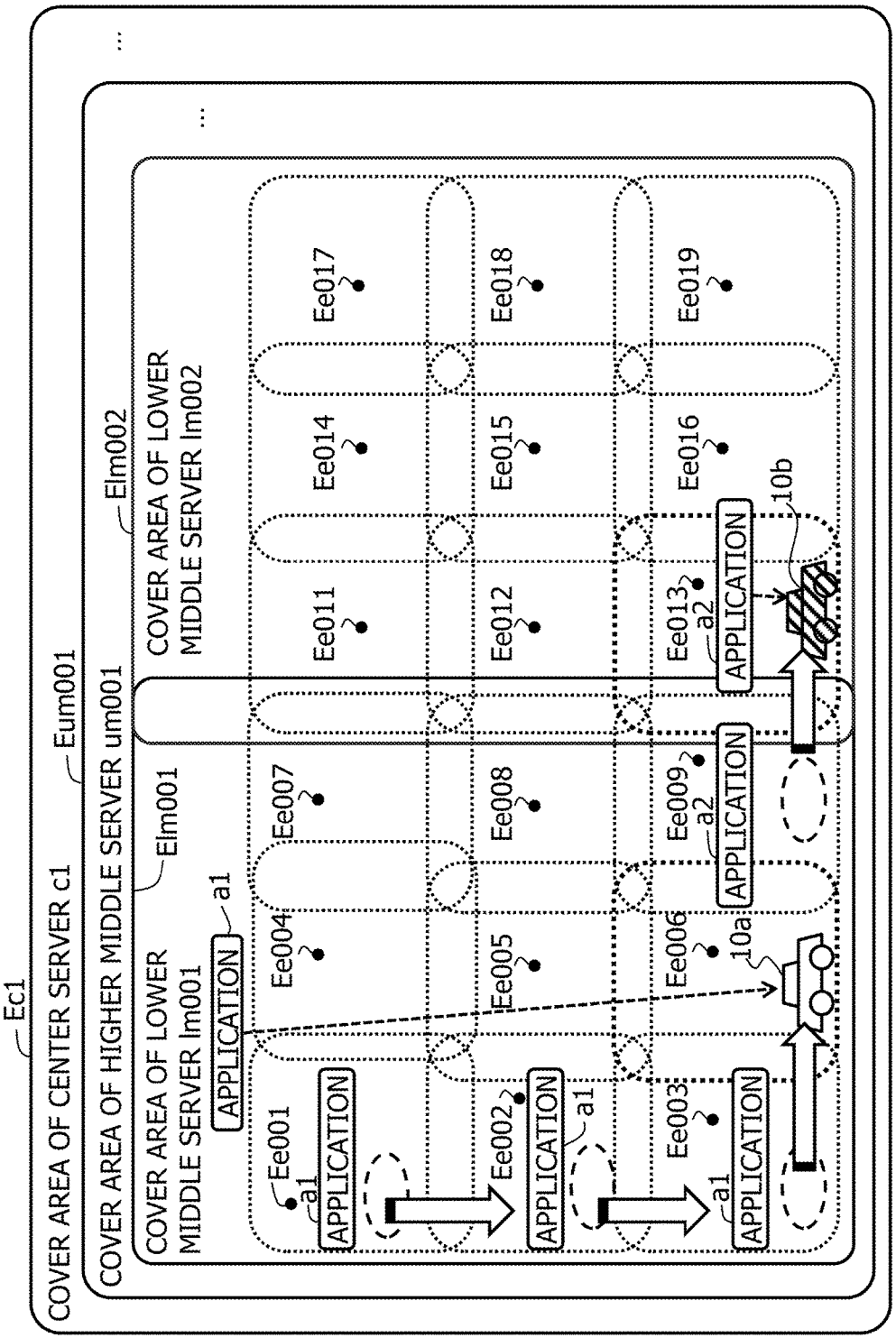
FIG. 4 is a diagram indicating the decision example of the servers by the wide area system manager according to the embodiment.

FIG. 4 is a diagram indicating the decision example of the servers by the wide area system manager according to the embodiment. In FIG. 4, same elements as that indicated by FIG. 2 are represented by same sign in FIG. 2.

FIG. 4 exemplifies a decision example of the server providing service for a plurality of terminals 10a, 10b of the different speed each other. The movement speed of the terminal 10a, which is carried on a vehicle illustrated by outline, is faster than the movement speed of terminal 10b, which is carried on a vehicle illustrated by slanted lines. In addition, in an example of FIG. 4, the terminal 10a carries out the application of application ID "a1", and the terminal 10b carries out the application of application ID "a2".

Firstly, as similar to an example of FIG. 2, it exemplifies the case that the terminal 10a enters the cover area "Ee006". The wide area system manager acquires the history of the stay time of which the terminal 10a stayed in the cover area from each server (S11 of FIG. 3).

As mentioned above in FIG. 3, the wide area system manager decides a server providing the service to the terminal 10a from the candidate server "e006", "lm001", "um001", and "c1" (S12 of FIG. 3). Because the movement speed of the terminal 10a is fast, the shift delay which indicates a ratio at the shift time for each candidate server tends to be a large value.

Therefore, the wide area system manager decides the lower middle server "lm001" that the communication time satisfies a predetermined response performance and a ratio at shift time reduces, as a server providing the service to the terminal 10a. Therefore, the wide area system manager deploys the service information of application ID "a1" in the lower middle server "lm001". In other words, the wide area system manager orders the shift processing of the service information for the lower middle server "lm001".

Secondly, it exemplifies the case that the terminal 10b enters the cover area "Ee013". The wide area system manager decides a server providing the service to the terminal 10b from candidate server "e013", "lm001", "um001", and "c1" (S12 of FIG. 3). Because the movement speed of terminal 10b is slow, the ratio at the shift time for each candidate server is small.

Accordingly, the wide area system manager decides the edge server "e013" where the communication time becomes minimum as the server providing the service to the terminal 10b. Therefore, the wide area system manager deploys the service information of application ID "a2" in the edge server "e013". In other words, the wide area system manager orders the shift processing of the service information for the edge server "e009".

In this way, it is possible that the wide area system manager selects a server which satisfies the response permission time based on a shift delay to fluctuate depending on the movement speed of the terminal 10 and a communication delay which is different depending on the candidate server. Thereby, it is possible that the wide area system manager decides a server which satisfies the response permission time for service as a server providing the service to the terminal 10 depending on the movement speed of the terminal 10.

Then, hardware constitution of the wide area system manager (information processing device) according to the embodiment will be described according to FIG. 5 and software block diagram of the wide area system manager in FIG. 5 will be described according to FIG. 6.

[Hardware Constitution of the Wide Area System Manager]

Figure 5:
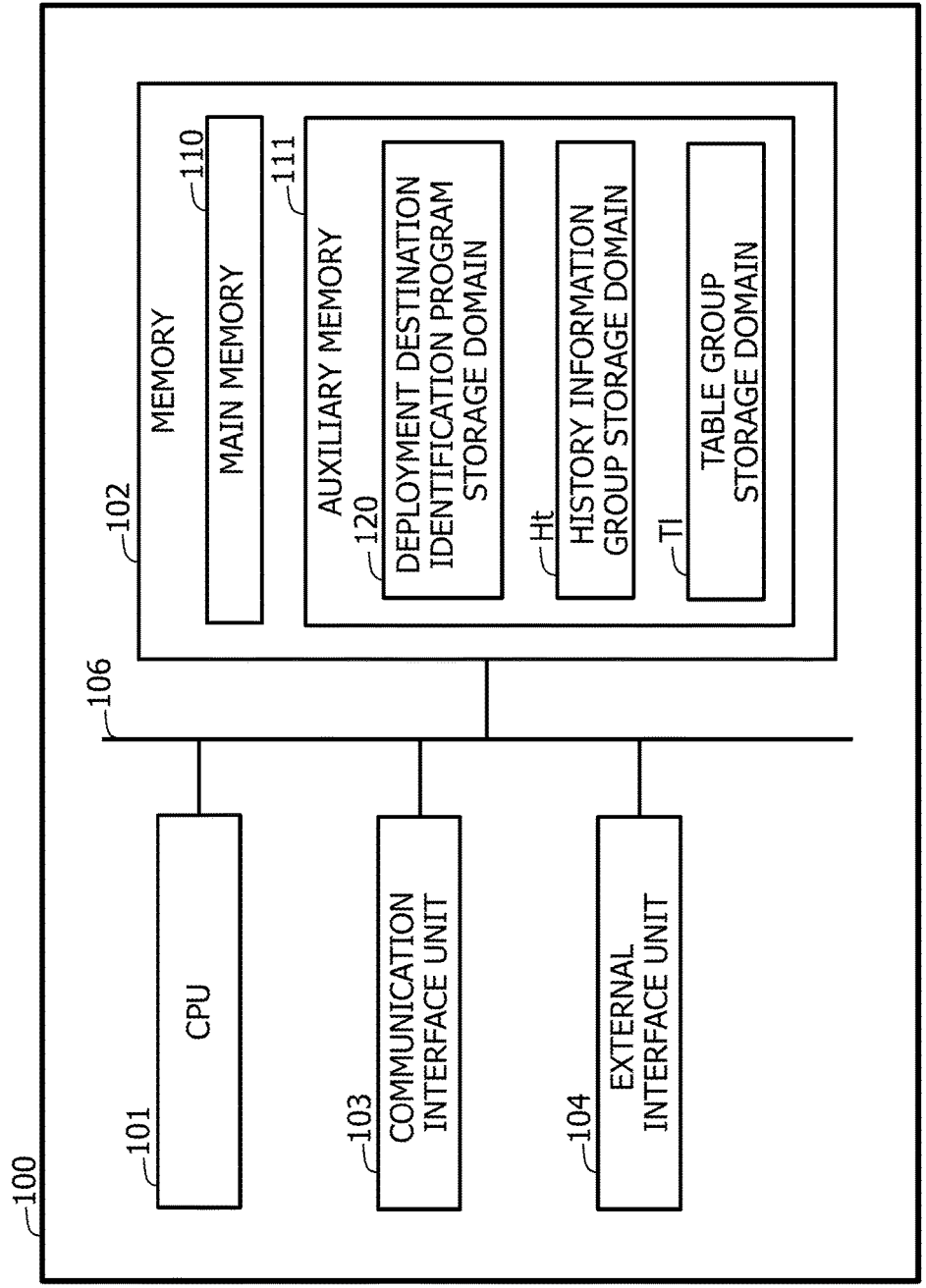
FIG. 5 is a diagram of hardware constitution of wide area system manager (administration device) 100 according to the embodiment.

FIG. 5 is a diagram of hardware constitution of wide area system manager (administration device) 100 according to the embodiment. The wide area system manager 100 has a CPU (Central Processing Unit) 101, a memory 102 including a main memory 110 and an auxiliary memory 111, etc., a communication interface unit 103, and an external interface unit 104. The all parts are connected through a bus 106 mutually.

The CPU 101 is connected to the memory 102, etc. through the bus 106 and controls the whole wide area system manager 100. The communication interface unit 103 connects with each server which are depicted in FIG. 1 through the Internet and transmits and receives data.

The main memory 110 including a RAM (Random Access Memory) memorizes the data that the CPU 101 processes. The auxiliary memory 111 includes an HDD (Hard disk drive), and/or a nonvolatile semiconductor memory.

The auxiliary memory 111 has a domain (not illustrated in FIG. 5) storing the program of the operation system that the CPU 101 carries out and deployment destination identification program storage domain 120, history information group storage domain "Ht", and table group storage domain "Tl".

The deployment destination identification program (below called as deployment destination identification program 120) in the deployment destination identification program storage domain 120 realizes the decision processing of the server which provides the service to the terminal 10 by the execution of the CPU 101.

The history information group (below called as history information group Ht) in the history information group storage domain "Ht" is the information that the deployment destination identification program 120 accesses and has a plurality of history information. The table group (below called as table group TI) in the table group storage domain TI is a table group that the deployment destination identification program 120 accesses and has a plurality of tables. The details of the history information group "Ht" and the table group TI will be mentioned later according to FIG. 6.

[Software Block of Wide Area System Manager 100]

Figure 6:
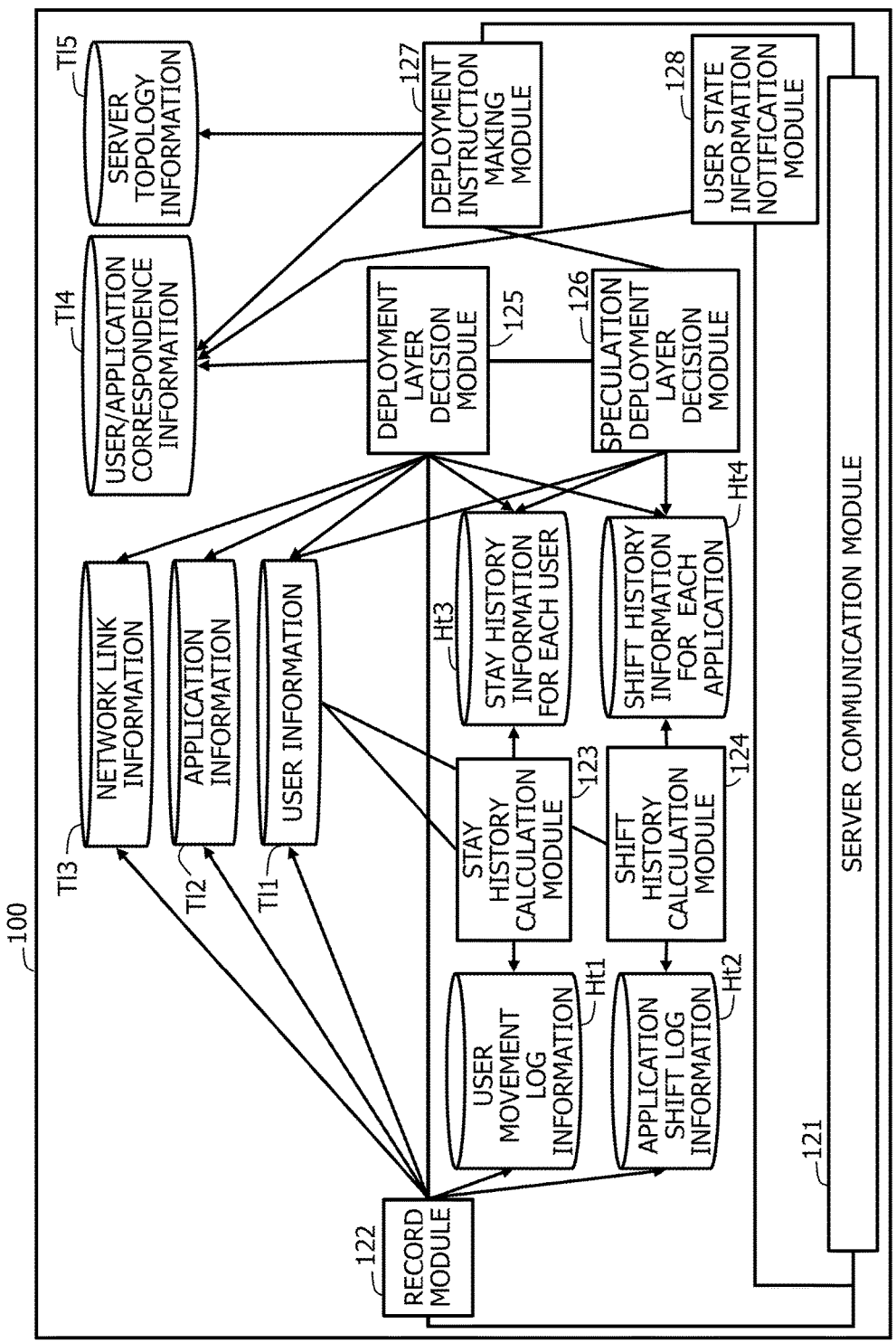
FIG. 6 is a diagram of constitution of the software block of wide area system manager 100 depicted in FIG. 5.

FIG. 6 is a diagram of constitution of the software block of wide area system manager 100 depicted in FIG. 5. The deployment destination identification program 120 depicted in FIG. 5 includes a server communication module 121, a record module 122, a stay history calculation module 123, and a shift history calculation module 124. In addition, the deployment destination identification program 120 further includes a deployment layer decision module 125, a speculation deployment area decision module 126, a deployment instruction making module 127, and a user state information notification module 128.

In addition, the history information group "Ht" depicted in FIG. 5 has a user movement log information "HU", an application shift log information "Ht2", a stay history information for each user "Ht3", and a shift history information for each application "Ht4".

The user movement log information "Ht1" has information about the movement between the cover areas of each terminal 10. The details of user movement log information "Ht1" will be mentioned later according to FIG. 7. The application shift log information "Ht2" has information about the shift processing of service information. The details of the application shift log information "Ht2" will be mentioned later according to FIG. 8.

The stay history information for each user "Ht3" has a history of the stay time of the terminal 10 in each cover area in every user. The details of the stay history information for each user "Ht3" will be mentioned later according to FIG. 9. The shift history information for each application "Ht4" has a history of the shift time needed for the shift processing of each application. The details of the shift history information for each application "Ht4" will be mentioned later according to FIG. 10.

In addition, the table group TI depicted in FIG. 5 has user information TI1, application information TI2, network link information TI3, user/application correspondence information TI4, and a server topology information TI5.

The user information TI1 has the information of the target user whom the wide area system manager 100 targets for the service. The details of user information TI1 will be mentioned later according to FIG. 11. The application information TI2 has information of the demand response performance of the service for every application. The details of the application information TI2 will be mentioned later according to FIG. 12.

The network link information TI3 has the information of the communication delay of each route between the server and the terminal 10. The details of the network link information TI3 will be mentioned later according to FIG. 13. The user/application correspondence information TI4 has the information of the server which provides the service to each terminal 10. The details of the user/application correspondence information TI4 will be mentioned later according to FIG. 14.

The server topology information TI5 has information of the cover area which is adjacent each other and the information of the application that the shift processing of the service information is completed. The details of the server topology information TI5 will be mentioned later according to FIG. 15.

The server communication module 121 connects each server and receives a notice of movement of the terminal 10, and a notice of start and end of the shift processing. In addition, the server communication module 121 transmits execution instruction of the shift processing or transmission instruction of the user state information to the server.

The record module 122 memorizes the information of a notice of movement and the notice of start and end of the shift processing which are received from the server in the user movement log information Ht1 and the application shift log information Ht2. In addition, the record module 122 updates information such as the user information TI1, the application information TI2 and the network link information TI3, based on a notice of movement and input information.

The stay history calculation module 123 refers to the user information TI1 and the user movement log information Ht1, acquires update information of the movement log information of each user and memorize it in the stay history information for each user Ht3. The details of the processing of the stay history calculation module 123 will be mentioned later according to a flow chart of FIG. 17.

The shift history calculation module 124 refers to the user information TI1 and the application shift log information Ht2, acquires update information of the shift information of each application and memorize it in the shift history information for each application Ht4. The details of the processing of shift history calculation module 124 will be mentioned later according to a flow chart of FIG. 18.

The deployment layer decision module 125 refers to the stay history information for each user Ht3 and the shift history information for each application Ht4, and acquires a ratio at shift time in the stay time for the terminal 10. In addition, the deployment layer decision module 125 refers to the network link information TI3 and acquires stay time of the terminal 10.

In addition, the deployment layer decision module 125 refers to the user information TI1 and the application information TI2, and decides a layer (also called as deployment layer) that a server providing the service to the terminal 10 belongs to, based on communication time and a ratio at the shift time. The details of the processing of the deployment layer decision module 125 will be mentioned later according to flow charts in FIG. 19 and FIG. 20.

The speculation deployment area decision module 126 decides a cover area (below, called as speculation deployment area) that performs a shift (deployment) of the service information speculatively beforehand, based on a ratio at shift time in the stay time. In addition, the speculation deployment area decision module 126 memorizes a decided speculation deployment area in the user/application correspondence information TI4. The details of the processing of the speculation deployment area decision module 126 will be mentioned later according to a flow chart of FIG. 23.

The deployment instruction making module 127 orders shift processing of the service information to the server of the cover area where the terminal 10 is located of the layer that the deployment layer decision module 125 decided. In addition, the deployment instruction making module 127 orders the shift processing of service information to the server of the speculation deployment area.

In addition, the deployment instruction making module 127 refers to the server topology information TI5, and orders deletion of the service information to the server of the cover area where a speculation deployment area does not include among the cover areas which the state information of the shift processing were finished. The details of the processing of the deployment instruction making module 127 will be mentioned later according to a flow chart of FIG. 24.

The user state information notification module 128 sends the user state information that a server providing the service to the terminal 10 holds to the server of the speculation deployment area depending on update of the user state information. The details of the processing of the user state information notification module 128 will be mentioned later according to a flow chart of FIG. 27.

Then, the details of the history information group Ht and the table group TI depicted in FIG. 6 will be described according to FIG. 7-FIG. 15.

[User Movement Log Information Ht1]

FIG. 7 is a diagram indicating an example of user movement log information Ht1. The user movement log information Ht1 has information about the movement between cover areas of each terminal 10. For example, the user movement log information Ht1 depicted in FIG. 7 has a time, a user ID (identify), an event, the item of the server. In FIG. 7, the event "user_in" indicates the entering to the cover area, and the event "user_out" indicates leaving from the cover area.

The information represented by an arrow Y1 of FIG. 7 indicates that the terminal 10 of user ID "u1" enters the cover area "Ee001" at a time "2014.12.21 12:20". In addition, the information represented by an arrow Y2 indicates that the terminal 10 of user ID "u1" left the cover area "Ee001" at a time "2014.12.21 12:30".

Similarly, the information represented by an arrow Y3 indicates that the terminal 10 of user ID "u2" enters the cover area "Ee003" at a time "2014.12.21 12:40". Similarly, the information represented by an arrow Y4 indicates that the terminal 10 of user ID "u2" left the cover area "Ee003" at a time "2014.12.21 12:52". Other information has similar information of each item.

[Application Shift Log Information Ht2]

FIG. 8 is a diagram indicating an example of application shift log information Ht2. The application shift log information Ht2 has information about the shift processing of service information. The application shift log information Ht2 depicted in FIG. 8 has a time, an application ID, an event, and an item of the server of the shift destination. The event "migrate_start" depicted in FIG. 8 indicates a start of the shift processing, and the event "migrate_end" indicates completion of the shift processing.

The information represented by an arrow Y11 of FIG. 8 indicates that the shift processing of service information of the application ID "a2" started from server "e003" to the server "e006" at a time "2014.12.21 12:52". In addition, the information represented by an arrow Y12 indicates that the shift processing concerned was finished at a time "2014.12.21 12:56". Other information has similar information of each item.

[Stay History Information for Each User Ht3]

FIG. 9A and FIG. 9B are diagrams indicating an example of stay history information for each user Ht3. The stay history information for each user Ht3 has a history of the stay time of the terminal 10 in each cover area. The stay history information for each user Ht3 has items of position information, entry time, leaving time and stay time, for example. The position information indicates a cover area (cover area of the edge server "e00*x*") where the terminal 10 is located. The entry time indicates the time when the terminal 10 enters the cover area of the position information, and the leaving time indicates the time when the terminal 10 left the cover area of the position information.

FIG. 9A indicates an example of stay history information for each user Ht3-1 of user ID "u1". According to the example of FIG. 9A, the terminal 10 enters the cover area "Ee001" at a time "2014.12.21 12:20" and leaves the cover area "Ee001" at a time "2014.12.21 12:30", and the stay time is "00:10". Other information has similar information of each item.

FIG. 9B indicates an example of stay history information for each user Ht3-2 of user ID "u2". According to the example of FIG. 9B, the terminal 10 enters the cover area "Ee003" at a time "2014.12.21 12:40" and leaves the cover area "Ee003" at a time "2014.12.21 12:52", and the stay time is "00:12". Other information has similar information of each item.

[Shift History Information for Each Application Ht4]

FIG. 10 is a diagram indicating an example of shift history information for each application Ht4. The shift history information for each application Ht4 has a history of the shift time needed for the shift processing of each application. For example, the shift history information for each application Ht4 depicted in FIG. 10 has items of an application ID, a server of the origin of shift, a server of the shift destination, a start time, an end time and a shift time.

FIG. 10A indicates an example of shift history information for each application Ht4-1 of application ID "a1". According to the example of FIG. 10A, the shift time that the service information of application ID "a1" is shifted from the edge server "e001" to the edge server "e002" is a time "00:03". In addition, the shift time that the service information of application ID "a1" is shifted from the edge server "e002" to the edge server "e003" is a time "00:04".

FIG. 10B indicates an example of shift history information for each application Ht4-2 of application ID "a2". According to the example of FIG. 10B, the shift time that the service information of application ID "a2" is shifted from the edge server "e003" to the edge server "e006" is a time "00:04". In addition, the shift time that the service information of application ID "a2" is shifted from the edge server "e006" to the edge server "e009" is a time "00:03".

[User Information TI1]

Figure 11:
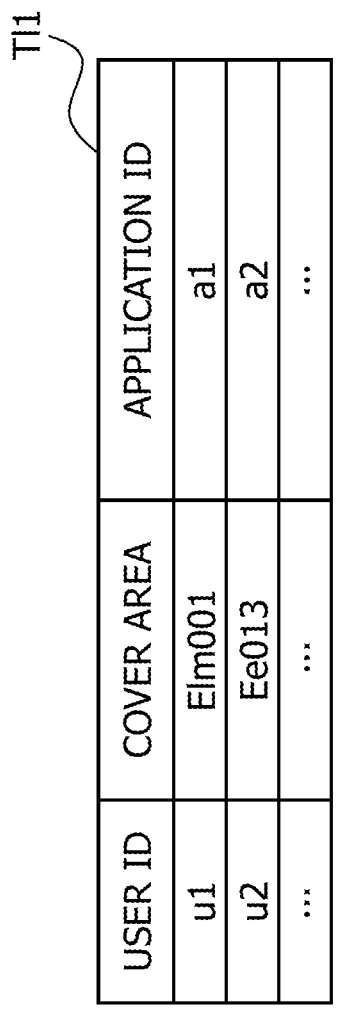
FIG. 11 is a diagram indicating an example of user information TI1.

FIG. 11 is a diagram indicating an example of user information TI1. The user information TI1 has the information of the target user whom the wide area system manager 100 targets for the service. The user information TI1 depicted in FIG. 11 has items of a user ID, a cover area of the server providing service to the terminal 10, an application ID that the terminal 10 uses, for example.

According to the example of FIG. 11, the terminal 10 of user ID "u1" receives the provision of the service of application ID "a1" from the lower middle server "lm001" corresponding to the cover area "Elm001". In addition, the terminal 10 of the user ID "u2" receives the provision of the service of application ID "a2" from the edge server "e013" corresponding to the cover area "Ee013".

[Application Information TI2]

Figure 12:
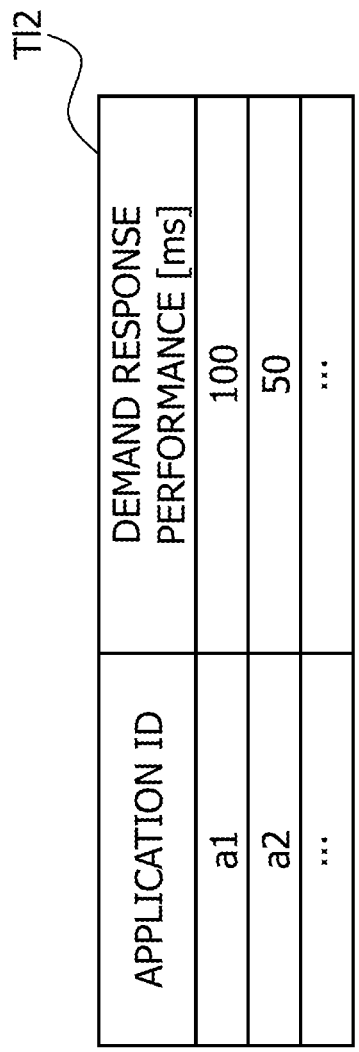
FIG. 12 is a diagram indicating an example of application information TI2.

FIG. 12 is a diagram indicating an example of application information TI2. The application information TI2 has information of the demand response performance of the service for every application. For example, the application information TI2 depicted in FIG. 12 has items of an application ID and the demand response performance (mil second: ms) which is prescribed beforehand.

According to the example of FIG. 12, the demand response performance of application ID "a1" is value "100 ms", and the demand response performance of application ID "a2" is value "50 ms". Therefore, the demand response performance of the application ID "a2" is high than that of the application ID "a1".

[Network Link Information TI3]

FIG. 13 is a diagram indicating an example of network link information TI3. The network link information TI3 has the information of the communication delay of each route between the server and the terminal 10 which were depicted in FIG. 1. For example, the network link information TI3 depicted in FIG. 13 has items of the link indicating the route, terminal point 1 of the route, terminal point 2 of the route, and communication delay (ms).

According to the example of FIG. 13, the communication delay of route "ln006" between the terminal (term) 10 and the edge server "e006" is a value "10 ms". In addition, the communication delay of the route "ln106" between the edge server "e006" and the lower middle server "lm001" is a value "10 ms". Therefore, the communication delay of the route with the terminal (term) 10 and the lower middle server "lm001" is value "20 (=10+10) ms".

In addition, according to the example of FIG. 13, the communication delay of route "ln201" between the lower middle server "lm001" and the higher middle server "um001" is a value "20 ms". Therefore, the communication delay of the route with the terminal (term) 10 and the higher middle server "um001" is a value "40 (=20+20) ms".

[User/Application Correspondence Information TI4]

Figure 14:
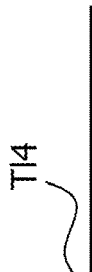
FIG. 14 is a diagram indicating an example of user/application correspondence information TI4.

FIG. 14 is a diagram indicating an example of user/application correspondence information TI4. The user/application correspondence information TI4 has the information of the server providing the service to each terminal 10.

For example, the user/application correspondence information TI4 depicted in FIG. 14 has items of a user ID, an application ID, a deployment layer that the server which provides the service to the terminal 10 belongs to, and the speculation deployment area.

The example of FIG. 14 illustrates that the terminal 10 of user ID "u1" receives the provision of the service of application ID "a1" from the lower middle server "lm00x" which belongs to a lower middle layer. In addition, according to the example of FIG. 14, the speculation deployment area is area "lm001".

Similarly, according to the example of FIG. 14, the terminal 10 of user ID "u2" receives the provision of the service of application ID "a2" from the edge server "e00x" belonging to an edge layer. In addition, according to the example of FIG. 14, the speculation deployment areas are areas "Ee004", "Ee006" . . . "Ee009", "Ee012" and "Ee013".

[Server Topology Information TI5]

FIG. 15 is a diagram indicating an example of server topology information TI5. The server topology information TI5 has information of the cover area adjacent each other and information of the application that the service information has been shifted, for every server.

For example, the server topology information TI5 depicted in FIG. 15 has items of a server ID, a server ID of the higher layer, the server ID of the lower layer, an adjacent cover area, and the deployment application. The deployment application indicates the application that the service information has been shifted.

According to the example of FIG. 15, the higher server which connects to the edge server "e001" is a server "lm001", and there is not the lower server. In addition, the cover area of the edge server "e001" is adjacent to the cover areas "Ee002", "Ee004" and "Ee005", and there is not the application that the service information has been shifted in the edge server "e001".

In addition, according to the example of FIG. 15, the upper middle server which connects to the lower middle server "lm001" is a server "um001", and the lower server which connects to the lower middle server "lm001" is the edge server "e001"-"e009". In addition, the cover area of the lower middle server "lm001" is adjacent to the cover area "Elm002", and the lower middle server "lm001" has been shifted the service information of application ID "a2".

[Software Block of Lower Middle Server lm001, Edge Server e001, e002]

Figure 16:
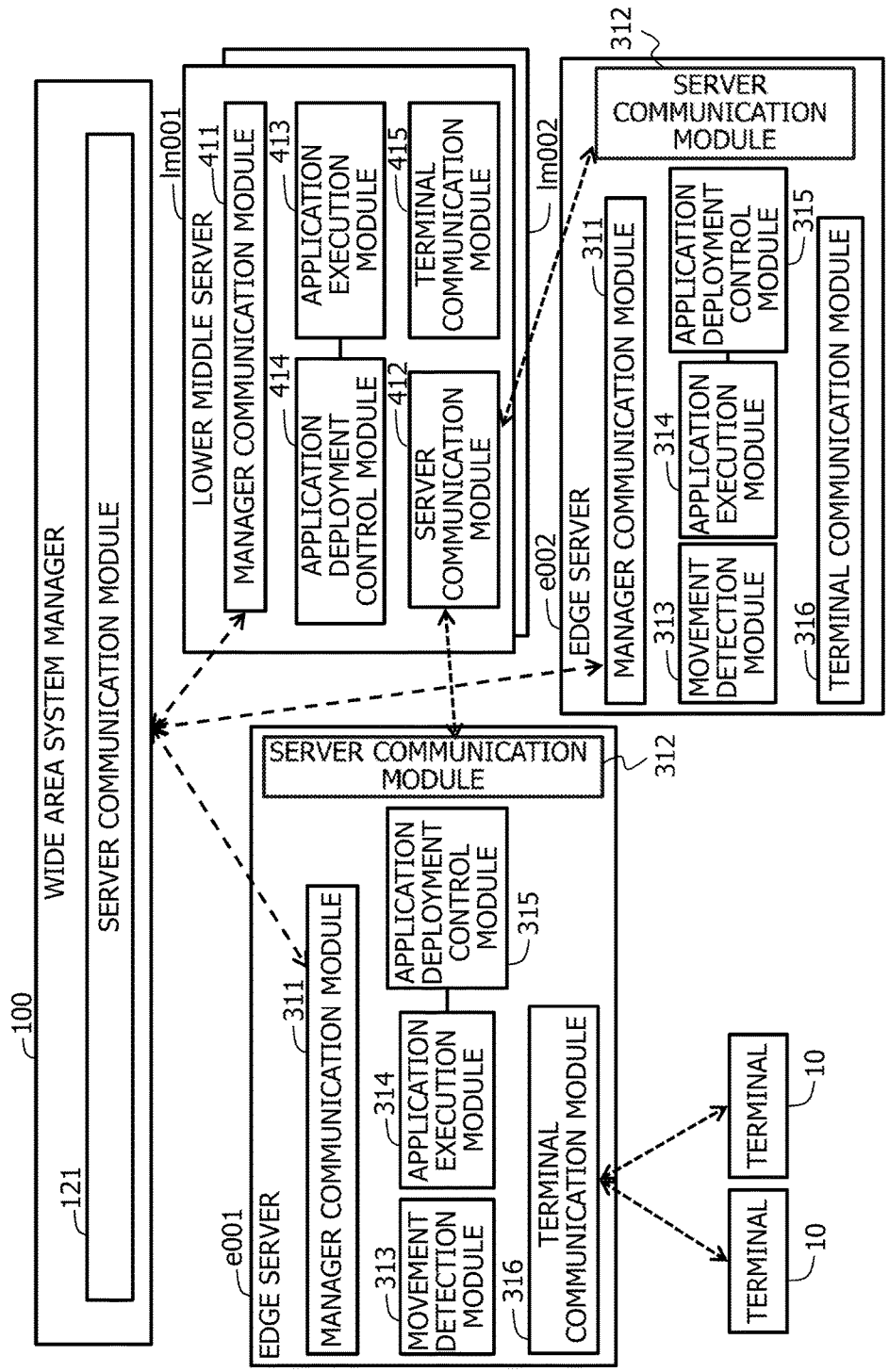
FIG. 16 is a diagram indicating an example of the software block of lower middle server "lm001" and edge servers "e001" and "e002".

FIG. 16 is a diagram indicating an example of the software block of lower middle server "lm001" and edge servers "e001" and "e002". In addition, software blocks of the center server c1 and the higher middle server "um001" are similar to a software block of the lower middle server "lm001" and the edge servers "e001" and "e002" depicted in FIG. 16.

The edge server "e001" has a manager communication module 311, a server communication module 312, a movement detection module 313, an application execution module 314, an application deployment control module 315, and a terminal communication module 316.

The manager communication module 311 is connected to the server communication module 121 in the wide area system manager 100, and controls communication processing with the wide area system manager 100. The server communication module 312 controls communication processing with the lower middle server "lm001".

The movement detection module 313, for example, manages the position of the terminal 10 based on wireless communication, and detects movement of the terminal 10 according to the processing of MME (Mobility Management Entity). And the movement detection module 313 sends a notice of movement of the terminal 10 to the wide area system manager 100 through the manager communication module 311.

The application execution module 314 carries out application which provides the service. The application deployment control module 315 carries out the shift processing of the service information depending on the instruction of the shift processing of the service information from the wide area system manager 100. In other words, the application deployment control module 315 carries out installation processing of the application and start processing of the application, copying processing of the user state information whom the application uses. The terminal communication module 316 controls the communication processing with the terminal 10.

The software blocks in the edge server "e002" depicted in FIG. 16 is similar to that of the edge server "e001". In addition, the lower middle server "lm001" depicted in FIG. 16 has a manager communication module 411, a server communication module 412, an application execution module 413, an application deployment control module 414, and a terminal communication module 415.

The manager communication module 411 is connected to the server communication module 121 in the wide area system manager 100, and controls the communication processing with the wide area system manager 100. The server communication module 412 controls the communication processing with the edge servers "e001"-"e009" and the higher middle server "um001".

The application execution module 413, the application deployment control module 414 and the terminal communication module 415 perform processing as similar to the processing of modules which are same name in the edge server "e001". In addition, not illustrated in FIG. 16, but the software blocks of other lower middle server "lm00x" is similar, too.

Then, according to FIG. 17-FIG. 20, the details of the processing of deployment destination identification program 120 in the wide area system manager 100 will be described. According to FIG. 17, the details of the processing of the stay history calculation module 123 will be described. According to FIG. 18, the details of the processing of the shift history calculation module 124 will be described. In addition, according to FIG. 19 and FIG. 20, the details of the processing of the deployment layer decision module 125 will be described.

[Processing of Stay History Calculation Module 123]

Figure 17:
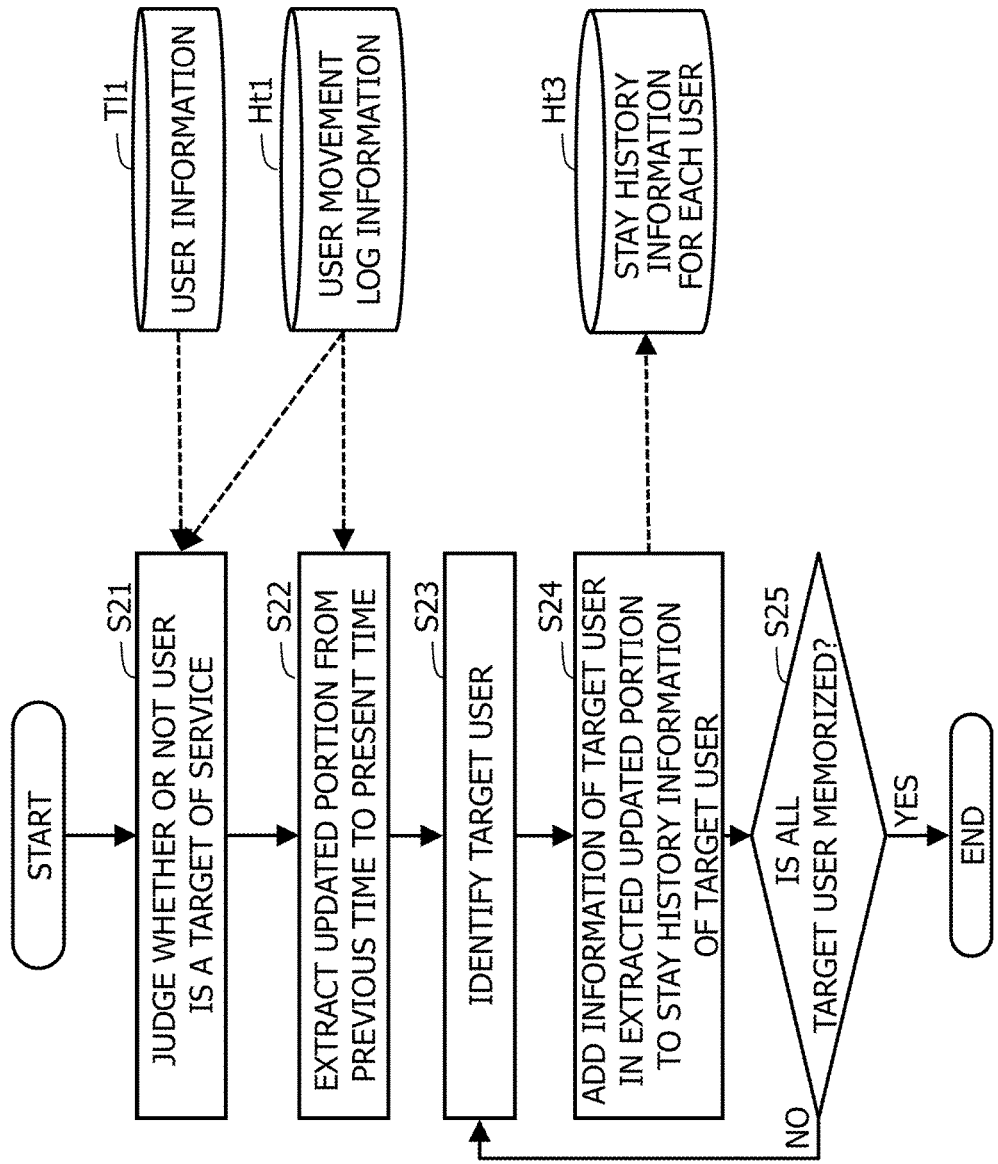
FIG. 17 is a diagram of flow chart explaining processing of stay history calculation module 123 explained in FIG. 6.

FIG. 17 is a diagram of flow chart explaining processing of stay history calculation module 123 explained in FIG. 6. When the movement detection module 313 in the edge server "e00x" detects entry and leaving for the cover area of the terminal 10, the movement detection module 313 sends a notice of movement to the wide area system manager 100. The stay history calculation module 123 starts processing which is illustrated in flow chart of FIG. 17 depending on the reception of the notice of movement.

S21: Depending on the reception of the notice of movement, the stay history calculation module 123 refers to the user movement log information Ht1 and acquires a user ID of terminal 10 that the movement log was updated. And the stay history calculation module 123 refers to the user information TI1 and judges whether the user ID which is acquired is the user (called as target user) whom the wide area system manager 100 targets. When the user ID is not the target user, the stay history calculation module 123 does not handle the process S22-S25.

S22: The stay history calculation module 123 refers to the user movement log information Ht1 and extracts information of the user movement log information Ht1 from a time when the stay history information for each user Ht3 has been updated to a present time.

S23: The stay history calculation module 123 identifies a target user for the terminal 10 which moved based on the user movement log information Ht1 which is extracted.

S24: The stay history calculation module 123 adds (memories) the movement log information of the target user among the updated information which is extracted to the stay history information for each user Ht3.

For example, the stay history calculation module 123 refers to the user movement log information Ht1 depicted in FIG. 7 and extracts the log information indicating that the terminal 10b of user ID "u2" has entered to the cover area "Ee013" of the edge server "e013". And the stay history calculation module 123 memorizes the log information which is extracted in the stay history information for each user Ht3 of the user ID "u2" depicted in FIG. 9B.

S25: The stay history calculation module 123 judges whether the update information of the user movement log information Ht1 of all users has been stored in the stay history information for each user Ht3.

When the updated information of all users has not been stored (No of S25), the stay history calculation module 123 move to processing of process S23 and identifies a different target user. On the other hand, the stay history calculation module 123 finishes the calculation processing of stay history when the updated information of all target users has been stored (Yes of S25).

Figure 18:
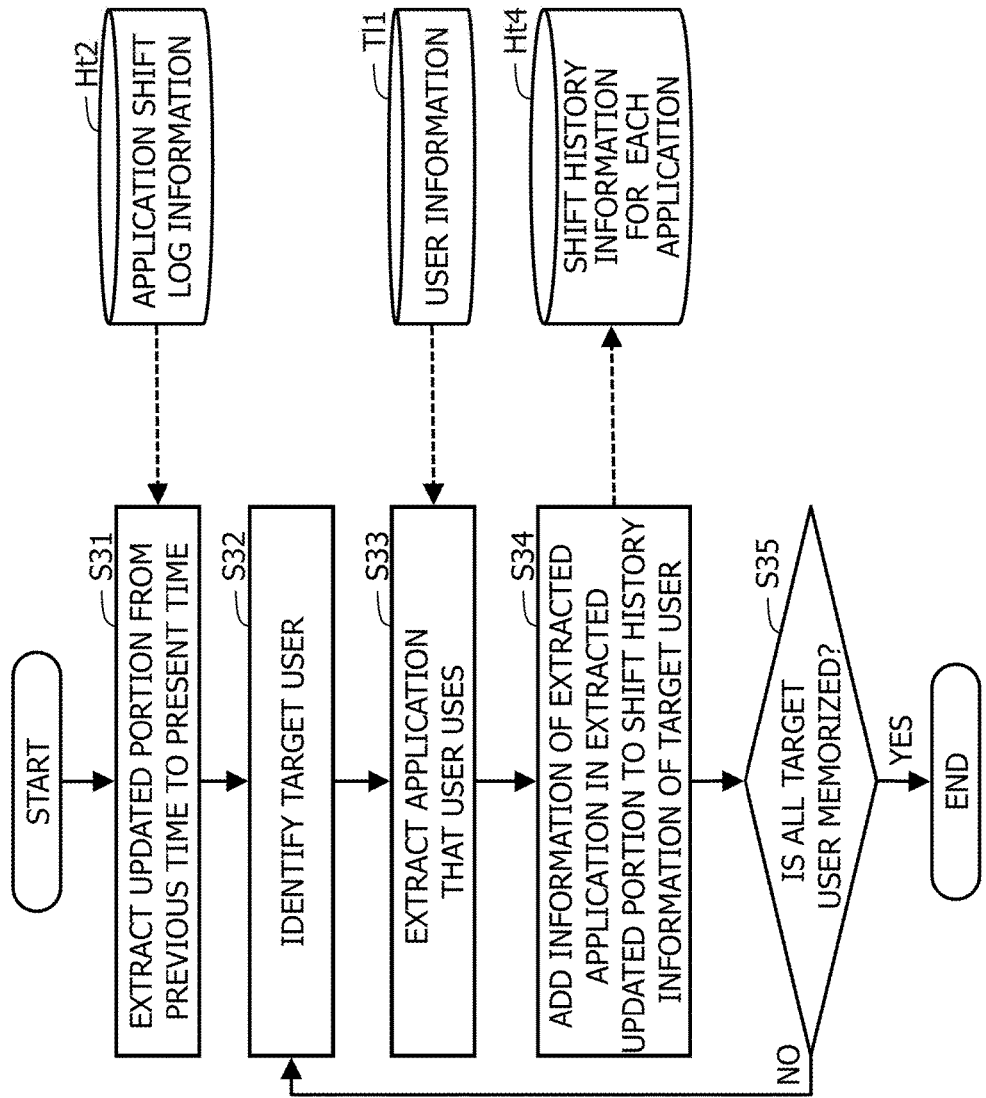
FIG. 18 is a diagram of flow chart explaining processing of shift history calculation module 124 which is explained in FIG. 6.

[Processing of shift history calculation module 124] FIG. 18 is a diagram of flow chart explaining processing of shift history calculation module 124 which is explained in FIG. 6. As similar to the stay history calculation module 123, the shift history calculation module 124 starts processing depicted in a flow chart of FIG. 18 depending on the reception of the notice of movement.

S31: Depending on the reception of the notice of movement, the shift history calculation module 124 refers to the application shift log information Ht2 and extracts information of the application shift log information Ht2 from a time when the shift history information for each application Ht4 has been updated to a present time.

S32: The shift history calculation module 124 identifies a target user using the application that the shift processing produced based on the application shift log information Ht2 which is extracted the updated information.

S33: The shift history calculation module 124 extracts the application that a target user uses with reference to the user information TI1.

S34: The shift history calculation module 124 memorizes the shift log information of the application among the updated information which is extracted to the shift history information for each application Ht4.

For example, the shift history calculation module 124 refers to the application shift log information Ht2 depicted in FIG. 8 and extracts log information of the shift processing of the application ID "a2" for the edge server "e009" from the edge server "e006". And the stay history calculation module 123 memorizes the log information which is extracted in the shift history information for each application Ht4 of the user ID "u2" depicted in FIG. 10B.

S35: The shift history calculation module 124 judges whether or not the updated information of application shift log information Ht2 of all users were memorized in the shift history information for each application Ht4.

When the updated information of application shift log information Ht2 of all users was not memorized (No of S35), the shift history calculation module 124 moves to processing of process S32 and identifies a different target user. On the other hand, when the shift history calculation module 124 memorized the updated information of all target users (Yes of S35), the shift history calculation module 124 finishes the calculation processing of the stay history.

[Processing of Deployment Layer Decision Module 125]

Figure 19:
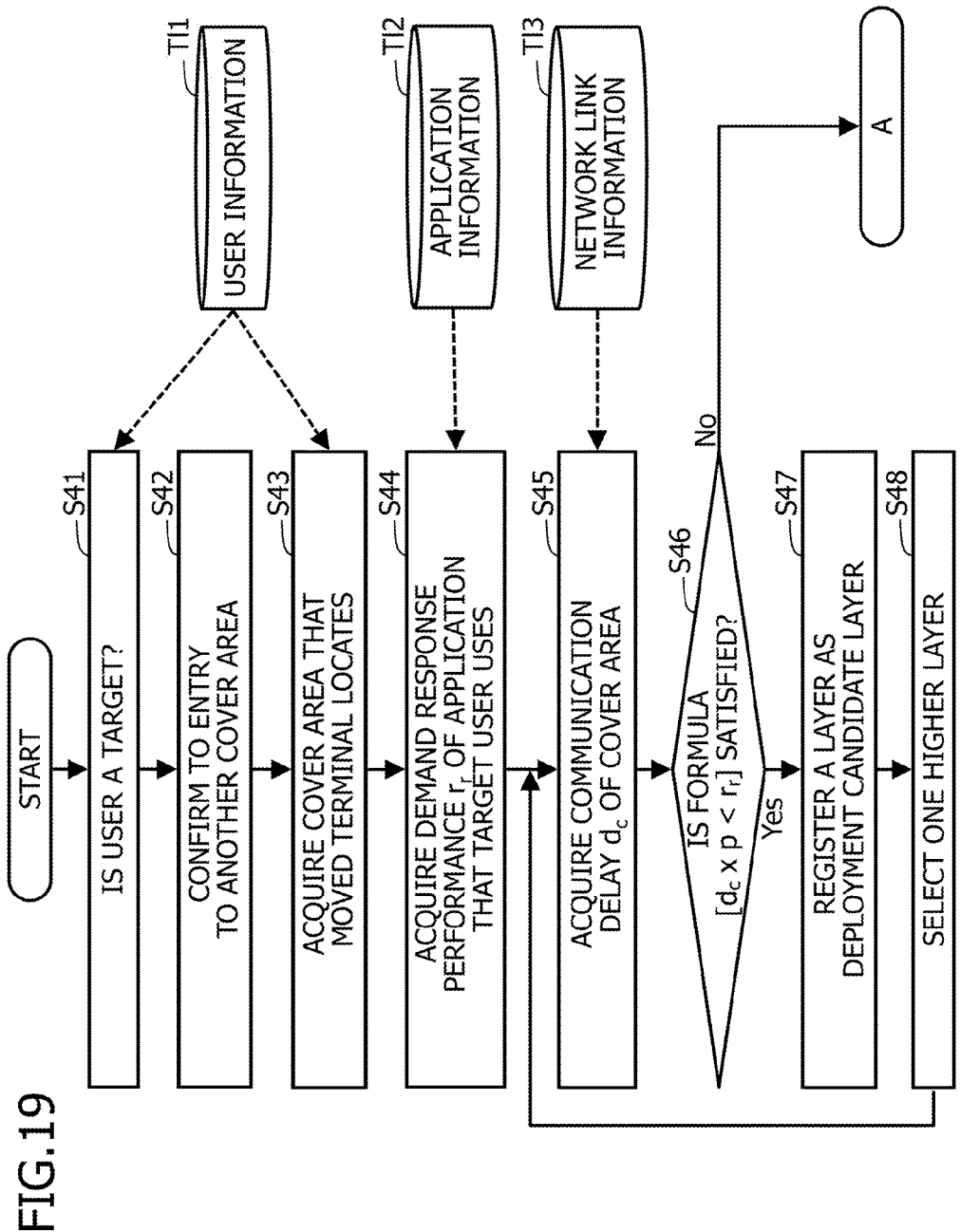
FIG. 19 is a diagram of first flow chart explaining processing of deployment layer decision module 125 which is explained in FIG. 6.

FIG. 19 is a diagram of first flow chart explaining processing of deployment layer decision module 125 which is explained in FIG. 6. As similar to the stay history calculation module 123, the deployment layer decision module 125 starts processing depicted to a flow chart of FIG. 19 depending on the reception of the notice of movement.

S41: Depending on the reception of the notice of movement, the deployment layer decision module 125 refers to the user information TI1 and judges whether or not a user of terminal 10 which moved is a target user. When the user of terminal 10 which moved is a target user, the deployment layer decision module 125 performs processing after following process S42.

S42: The deployment layer decision module 125 judges whether a notice of movement is a notice of movement indicating the entry into the cover area. In other words, the deployment layer decision module 125 performs processing after process S43 when the notice of movement indicates an event "user_in". When a notice of movement indicates an event "user_out", the deployment layer decision module 125 does not perform processing after process S43.

S43: The deployment layer decision module 125 acquires the cover area where terminal 10 is located with reference to the user information TI1.

S44: The deployment layer decision module 125 acquires demand response performance "$r_r$" of the application that a user of terminal 10 uses with reference to the application information TI2.

S45: The deployment layer decision module 125 selects a layer. For example, the deployment layer decision module 125 selects the layer from the bottom layer sequentially. In addition, the deployment layer decision module 125 refers to the network link information TI3 and acquires communication delay "$d_c$" with the server belonging to the layer which is selected and the terminal 10.

S46: The deployment layer decision module 125 judges whether the value that is multiplied the coefficient "p" by the communication delay "$d_c$" is less than the demand response performance "$r_r$". In other words, the deployment layer decision module 125 judges whether the formula "(communication delay "$d_c$"×coefficient "p")< (demand response performance "$r_r$") is satisfied. For example, the coefficient "p" in the embodiment is a value "3". For example, the coefficient "p" is set according to an inspection. For example, the coefficient "p" may be value "1".

S47: When the value is less than the demand response performance "$r_r$" (Yes of S46), the deployment layer decision module 125 registers the layer which was selected as a deployment candidate layer. In other words, the deployment layer decision module 125 registers the layer which was selected as the candidate deployment layer when the communication delay "$d_c$" of the layer which was selected falls into the demand response performance "$r_r$". The deployment layer decision module 125 in this way extracts one or more candidate deployment layer that the communication delay "$d_c$" of the communication time with the terminal 10 satisfies with the demand response performance "$r_r$".

S48: The deployment layer decision module 125 selects one higher-rank layer than the layer which is selected. In other words, the deployment layer decision module 125 selects a lower middle layer when an edge layer was selected in the process S45. And the deployment layer decision module 125 carries out the process S45, S46 for the lower middle layer.

And the deployment layer decision module 125 registers the lower middle layer as the candidate deployment layer when the formula "(communication delay "$d_c$"×coefficient "p")< (demand reply performance "$r_r$")" is satisfied (S47). As similar as above manner, the deployment layer decision module 125 carries out the process S45, S46 for the higher middle layer and the top layer.

Figure 20:
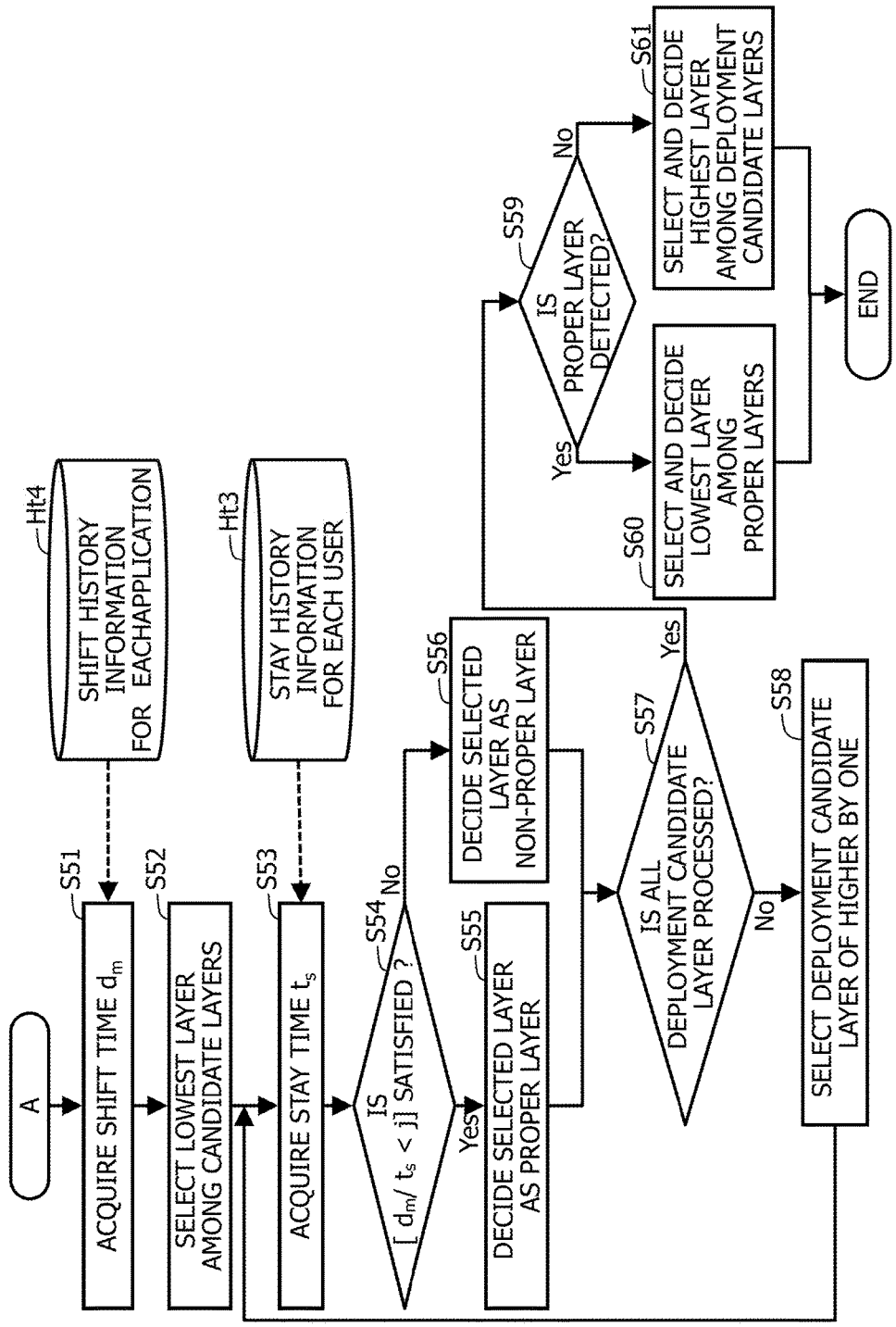
FIG. 20 is a diagram of second flow chart explaining processing of deployment layer decision module 125 which is explained in FIG. 6.

On the other hand, when the value is more than the demand response performance "$r_r$" (No of S46), the deployment layer decision module 125 completes the detection of the deployment candidate layer and moves to the processing of the flow chart (A) of FIG. 20. Generally, the communication delay "$d_c$" of the server belonging to a lower layer with the terminal 10 is smaller than the communication delay "$d_c$" of the server belonging to a higher layer with the terminal 10. Therefore, it is possible to detect a deployment candidate layer effectively by performing the determination from a lower layer sequentially.

FIG. 20 is a diagram of second flow chart explaining processing of deployment layer decision module 125 which is explained in FIG. 6.

S51: The deployment layer decision module 125 refers to the shift history information for each application Ht4 and acquires the shift time "$d_m$" of the application (called as target application) that the terminal 10 which moved uses.

For example, the deployment layer decision module 125 estimates the average of the past shift time of the target application as the shift time "$d_m$". Or the deployment layer decision module 125 estimates the most recent shift time of the target application as the shift time "$d_m$". But, it is not a thing limited to this example, and the deployment layer decision module 125 may acquire the appointed shift time beforehand as the shift time "$d_m$".

In this way, the shift history calculation module 124 acquires a history of the shift time from each server more, and the deployment layer decision module 125 acquires shift time based on the history. Therefore, it is possible to acquire the shift time depending on a target application appropriately.

S52: The deployment layer decision module 125 selects a lowest layer in the deployment candidate layers which is detected.

S53: The deployment layer decision module 125 refers to the stay history information for each user Ht3 and acquires the stay time "$t_s$" in the cover area of the layer which is selected of the terminal 10.

For example, the deployment layer decision module 125 acquires the past stay time in a plurality of cover areas belonging to the layer which is selected of the terminal 10, and estimates the average for the stay time which are acquired as the stay time "$t_s$". Or the deployment layer decision module 125 estimates the most recent stay time in the cover area belonging to the layer of the terminal 10 which is selected as the stay time "$t_s$".

Or the deployment layer decision module 125 may acquire the stay time "$t_s$" based on movement speed of the terminal 10 and the area (size) of the cover area. In addition, when there is not the stay history of the cover area belonging to the layer which is selected, the deployment layer decision module 125 acquires the stay time "$t_s$" based on the stay history of the cover area belonging to the lower layer of the layer which is selected. The details of the processing will be mentioned later according to FIG. 21.

S54: The deployment layer decision module 125 judges whether the formula (the shift time "$d_m$"/the stay time "$t_s$")< (shift influence coefficient "i") is satisfied. In other words, the deployment layer decision module 125 whether a ratio at the shift time "$d_m$" for the stay time "$t_s$" falls into the shift influence coefficient "j". For example, the shift influence coefficient in the embodiment is a value "0.25". The shift influence coefficient "j" indicates the threshold of the response performance about the shift processing, and the shift influence coefficient "j" is set according to inspection.

S55: When (the shift time "$d_m$"/the stay time "$t_s$") is less than the shift influence coefficient (Yes of S54), the deployment layer decision module 125 records the layer which is selected as an appropriate layer (that is, appropriate layer) which satisfies with the response performance of the shift delay.

S56: On the other hand, when (the shift time "$d_m$"/the stay time "$t_s$") exceeds the shift influence coefficient (No of S54), the deployment layer decision module 125 records the layer which is selected as a non-appropriate layer.

S57: The deployment layer decision module 125 judges whether the process S53-S56 were performed for all deployment candidate layers.

S58: When there is a deployment candidate layer of non-selection (No of S57), the deployment layer decision module 125 selects one higher-rank layer among the candidate deployment layers and carries out the process S53-S56. As described above, the higher layer has a larger cover area than a lower layer. Because the stay time in the higher layer is longer than the stay time in the lower layer, the ratio at shift time for the stay time reduces as the layer becomes higher. Therefore, as a higher layer, a ratio at the shift time for the stay time is more likely to become less than a shift influence coefficient.

In this way, the plural servers (information processing device) in the wide area distributed system according to the embodiment have a first information processing device belonging to a first layer and a second information processing device belonging to a second layer. In addition, the cover area (provision domain) of the server belonging to the first layer is wider than the cover area of the server belonging to the second layer. And the communication time of the server belonging to the first layer is longer than the communication time of the server belonging to the second layer.

The first layer indicates the higher layer of the second layer. Therefore, the communication time for server belonging to the first layer is longer than the communication time of the server belonging to the second layer. On the other hand, the ratio at the shift time for server belonging to the first layer is smaller than a ratio at the shift time of the server belonging to the second layer.

Therefore, when the terminal 10 moves, the shift delay is reduced while communication delay is increased as the layer becomes higher. Therefore, it is possible that the deployment layer decision module 125 selects a layer which satisfies the response permission time of the service for the moving terminal among a plurality of layers appropriately based on a shift delay and a communication delay which fluctuate depending on a layer.

S59: When completing the processing of process S53-S56 for all deployment candidate layers (Yes of S57), the deployment layer decision module 125 judges whether or not an appropriate layer is detected.

S60: When the appropriate layer is detected (Yes of S59), the deployment layer decision module 125 selects the lowest layer that the communication delay is minimized as the deployment layer among the appropriate layers.

In this way, the deployment layer decision module 125 extracts the server that the communication time satisfies a first standard value from a plurality of servers (information processing device). And, when there is servers that the ratio at the shift time meets a second standard value among the servers that the communication time meets the first standard value, the deployment layer decision module 125 decides the server that the communication time is shortest among the servers which meeting the second standard value.

In other words, the deployment layer decision module 125 detects candidate deployment layer that the value which is multiplied the communication time (communication delay "$d_c$") by the coefficient "p" is less than a first standard value (demand response performance "$r_r$"). In other words, the deployment layer decision module 125 extracts the candidate deployment layer that the communication delay meets response performance of the service.

And the deployment layer decision module 125 decides a layer that the communication time is smallest among the appropriate layers when there is the appropriate layer that a ratio at the shift time (shift delay "$d_m$") for the stay time "$t_s$" is less than the second standard value (shift influence coefficient "j") among the deployment candidate layers. In other words, the deployment layer decision module 125 selects a lower layer of which a communication delay is reduced among the appropriate layers as a deployment layer when there is the appropriate layer that a shift delay meets predetermined response performance among the deployment candidate layers.

Therefore, it is possible that the deployment layer decision module 125 selects a layer which satisfies the response performance of the communication delay and response performance of the shift delay and reduces a communication delay as a deployment layer. Therefore, it is possible that the deployment layer decision module 125 decides a server which meets the response permission time of the service as a server providing the service to the terminal 10 depending on the movement speed of the terminal 10.

S61: On the other hand, the deployment layer decision module 125 selects a highest layer which reduces a shift delay as a deployment layer among the deployment candidate layers when an appropriate layer is not detected (No of S59).

In this way, the deployment layer decision module 125 extracts the server that the communication time meets the first standard value among the plurality of servers (information processing device). And, when there is not the server that a ratio at shift time meets the second standard value among the servers that the communication time meet the first standard value, the deployment layer decision module 125 decides a server that a ratio at the shift time is smallest among the servers which meet the first standard value.

In other words, the deployment layer decision module 125 decides a layer that the ratio at the shift time is smallest among the candidate deployment layers when there is not the appropriate server that a ratio at the shift time (shift delay "$d_m$") for the stay time "$t_s$" is less than the second standard value (shift influence coefficient "j") among the deployment candidate layers. In other words, the deployment layer decision module 125 selects a higher layer which satisfies the response performance of the communication and reduces a shift delay, as a deployment layer when there is not the appropriate layer that a shift delay meets predetermined response performance among the deployment candidate layers.

Therefore, it is possible that the deployment layer decision module 125 selects a layer which meets the response performance of the communication delay and reduces a shift delay as a deployment layer. Therefore, it is possible that the deployment layer decision module 125 decides a server which meets the reply permission time of the service as a server providing the service to the terminal 10 depending on movement speed of the terminal 10.

Then, according to FIG. 21, FIG. 22, example of the decision processing of the server by deployment layer decision module 125 explained in FIG. 19, FIG. 20 will be described.

Example

Figure 21:
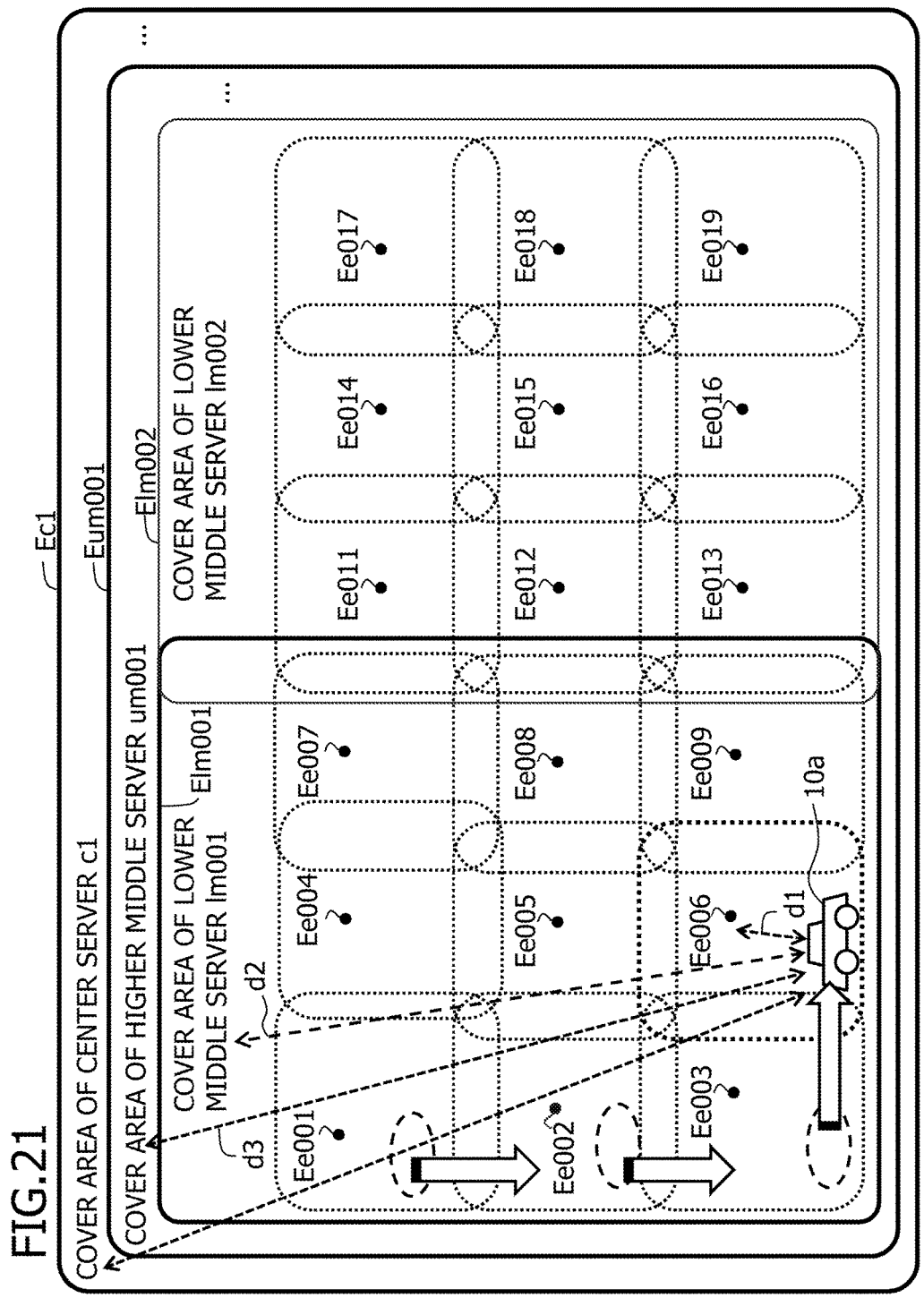
FIG. 21 is a diagram explaining example of the processing of deployment layer decision module 125 explained according to FIG. 19, FIG. 20.

FIG. 21 is a diagram explaining example of the processing of deployment layer decision module 125 explained according to FIG. 19, FIG. 20. In FIG. 21, same elements as that in FIG. 2 are represented by same marks indicated in FIG. 2.

As similar to an example of FIG. 2, FIG. 21 exemplifies the decision of the server when the terminal 10a moves and enters the cover area "Ee006". The terminal 10a is used by user ID "u1" and uses application of application ID "a1".

Because the user information TI1 depicted in FIG. 11 includes information of user ID "u1", the deployment layer decision module 125 determines that the user ID "u1" is a target user (S41 of FIG. 19). In addition, the deployment layer decision module 125 acquires the cover area "Ee006" where the terminal 10a entered based on a notice of movement (S42, S43).

(Judgment of the Reply Delay)

The deployment layer decision module 125 refers to the application information TI2 depicted in FIG. 12 and acquires the demand response performance "100 (=rr) ms" of the application ID "a1" (S44). In addition, the deployment layer decision module 125 refers to the network link information TI3 depicted in FIG. 13 and acquires the communication delay "10 ms" of route "ln006" d1 between the terminal 10a and the edge server "e006" (S45).

A value of (communication delay "10 ms"×coefficient "3") is less than the demand response performance "100" (Yes of S46). Therefore, the deployment layer decision module 125 registers an edge layer as a deployment candidate layer (S47).

Then, the deployment layer decision module 125 selects a lower middle layer (S48), and acquires the communication delay "20 (=10+10) ms" of the route d2 between the terminal 10a and lower middle server "lm001" (S45). Because a value of (communication delay "20 ms"×coefficient "3") is less than the demand response performance "100" (Yes of S46), the deployment layer decision module 125 registers the lower middle layer as the candidate deployment layer (S47).

As similar as, the deployment layer decision module 125 selects higher middle layer (S48) and acquires the communication delay "40 (=20+20) ms" of the route d3 between terminal 10a and the higher middle server "um001" (S45). The deployment layer decision module 125 does not register the higher middle server as the candidate deployment layer, because a value (communication delay "40 ms"×coefficient "3") exceed the demand response performance "100" (No of S46).

Therefore, it is possible that the deployment layer decision module 125 detects the edge layer and the lower middle layer which meets the response performance of the communication delay as a deployment candidate area.

(Judgment of the Shift Delay)

Then, the deployment layer decision module 125 refers to the shift history information for each application Ht4-1 of the application ID "a1" depicted in FIG. 10A and acquires the shift time "$d_m$" of the application ID "a1" (S51 in FIG. 20).

According to the shift history information for each application Ht4-1 of FIG. 10A, shift time to the edge server "e002" from the edge server "e001" is time "00:03" and the shift time from the edge server "e002" to the edge server "e003" is a time "00:04". Therefore, the deployment layer decision module 125 acquires average "3.5 min" of the shift time as the shift time "$d_m$".

Then the deployment layer decision module 125 selects an edge layer among the deployment candidate layers (that is, edge layer, or lower middle layer (S52). And the deployment layer decision module 125 acquires the stay time "$t_s$" of the cover area "Ee006" (S53). Especially, the deployment layer decision module 125 refers to the stay history information for each user Ht3-1 depicted by FIG. 9A and acquires average time "8.7 min" (≈26/3) of the stay time of the cover area "Ee001" . . . "Ee003" as the stay time "$t_s$".

The ratio "0.40 (=3.5/8.7)" of the shift time "3.5 min" for the stay time "8.7 min" does not fall in the shift influence coefficient "0.25" (No of S54). That is, since the edge layer does not meet the response performance of the shift delay, the deployment layer decision module 125 decides that the edge layer is a non-appropriate layer (S53).

Then the deployment layer decision module 125 selects a lower middle layer (S52). In addition, the deployment layer decision module 125 refers to the stay history information for each user Ht3-1 depicted in FIG. 9A and acquires the stay time of the cover area of the lower middle server "lm001". But the stay history information for each user Ht3-1 does not have the stay time of the cover area of the lower middle layer.

Therefore, the deployment layer decision module 125 acquires the total for the stay times of the cover area "Ee001" . . . "Ee009" corresponding to the cover area "Elm001" as the stay time "$t_s$" of the lower middle server lm001 (S53). Especially, the deployment layer decision module 125 acquires total "26 min" of the stay time of the cover area "Ee001" . . . "E003" as the stay time "$t_s$".

The ratio "0.13 (=3.5/26)" of the shift time "3.5 min" for the stay time "26 min" falls in the shift influence coefficient "0.25" (Yes of S54). Therefore, the deployment layer decision module 125 decides that the lower middle layer is an appropriate layer (S55).

The appropriate layer is only a lower middle layer. Therefore, the deployment layer decision module 125 decides a lower middle layer as a deployment layer (Yes of S59 and S60). In other words, the deployment layer decision module 125 decides the server "lm001" belonging to the lower middle layer as a server providing the service to the terminal 10a.

In addition, when movement speed of terminal 10a is slower, the ratio at shift time for the stay time of the edge layer falls in the shift influence coefficient (Yes of S54). Therefore, the deployment layer decision module 125 decides the edge layer that a communication delay is small among the plurality of appropriate layers (edge layer, lower middle layer) as a deployment layer (Yes of S59 and S60). Therefore it is possible that the deployment layer decision module 125 decides the server which meets the response permission time and reduces a communication delay, as a server providing the service to the terminal 10.

Or, when movement speed of terminal 10a is faster, the ratio at shift time for the stay time of the lower middle layer does not fall in the shift influence coefficient (No of S54). Because in this case an appropriate layer does not exist (No of S59), the deployment layer decision module 125 decides the lower middle layer that a ratio at the shift time is smallest among the deployment candidate layers (edge layer, lower middle layer), as a deployment layer. Therefore, it is possible that the deployment layer decision module 125 selects the server which meets the response performance of the communication delay and reduces a shift delay, as a deployment layer.

In this way, it is possible that the deployment layer decision module 125 selects a server which reduces the response waiting time based on a communication delay according to the communication times, which are different depending on the server, and the shift delay based on the ratio at the shift time for the stay time, which fluctuate depending on the movement speed of the terminal 10. Therefore, it is possible that the deployment layer decision module 125 decides a server which meets the response permission time among the plurality of servers depending on the movement speed of the terminal 10 appropriately.

(Shift Processing)

And the deployment instruction making module 127 refers to the server topology information TI5 and instructs the shift processing of the service information of the application ID "a1".

FIG. 22 is a diagram indicating an example of server topology information TI5-1 in the embodiment. According to the item of the deployment application in the server topology information TI5-1 depicted by FIG. 22, the server that the shift processing (deployment) of the service information of application ID "a1" has been finished does not exist. Therefore, the deployment instruction making module 127 instructs the shift processing of service information of application ID "a1" to the server "lm001" from the server "e003".

In addition, the deployment layer decision module 125 in the embodiment extracts a layer which meets the response performance of the shift delay according whether the formula (shift time "$d_m$"/stay time "$t_s$"< shift influence coefficient "j") is satisfied. But it is not a thing limited to this example.

For example, the deployment layer decision module 125 may extract a layer which meets the response performance of the shift delay whether the frequency of the shift processing of the terminal 10 in a specified period falls in an appointed shift influence coefficient "j". The frequency of the shift processing of terminal 10 in a specified period corresponds to a ratio at the shift time for the stay time substantially.

Then, according to FIG. 23, the details of the processing of speculation deployment area decision module 126 will be described. And according to FIG. 24, the details of the processing of deployment instruction making module 127 will be described.

[Speculation Deployment Area Decision Module 126, Deployment Instruction Making Module 127]

As depicted by the flow chart in FIG. 20, when an appropriate layer was not detected (No of S59), the deployment layer decision module 125 selects a highest layer as a deployment layer among the candidate deployment layers (S61). In other words, when there is not the layer that the shift delay meets predetermined response performance, the deployment layer decision module 125 selects a layer that the response delay is smallest as a deployment layer.

When the demand response performance "$r_p$" of the service is high, the deployment layer decision module 125 detects a lower layer as a candidate deployment layer. Because the shift delay of the lower layer tends to be bigger, a deployment candidate layer may not meet the response performance of the shift delay. In addition, the shift delay increases when the movement speed of the terminal 10 is fast. Therefore, a deployment candidate layer may not meet the response performance of the shift delay.

Therefore, the speculation deployment area decision module 126 instructs a shift of the information about the service to the server (information processing device) which is decided and the server that the cover area is a cover area adjacent to the cover area (provision domain) of the server which is decided. In other words, the speculation deployment area decision module 126 instructs the shift processing of the service information to the server that the cover area is adjacent to the that of the server which is decided in addition to the server which is decided as a server which provides service to the terminal 10.

In this way it is possible to shift the service information to the server of the cover area around the cover area where the terminal 10 is located speculatively. Therefore, when the terminal 10 moves to the neighboring cover areas, it is possible to omit the shift processing and to provide the service without needing the response waiting time based on the shift processing.

Thereby, it is possible to satisfy the response performance of the shift delay in addition to the response performance based on the communication time even if the movement speed of the terminal 10 is high or demand response performance of the communication delay is high.

(Processing of Speculation Deployment Area Decision Module 126)

Figure 23:
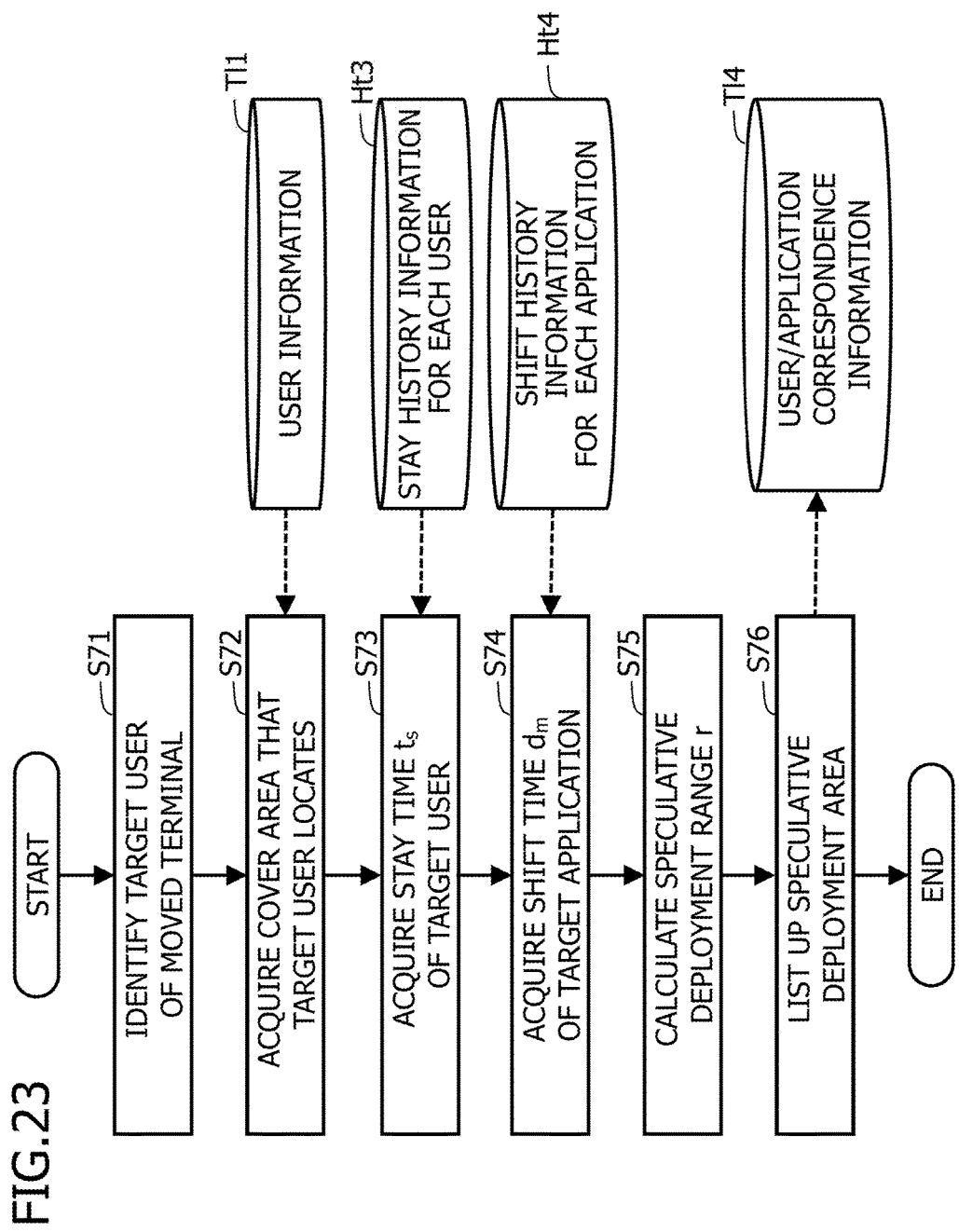
FIG. 23 is a diagram of flow chart explaining processing of speculation deployment area decision module 126 which was explained in FIG. 6.

FIG. 23 is a diagram of flow chart explaining processing of speculation deployment area decision module 126 which was explained in FIG. 6. The speculation deployment area decision module 126 starts processing indicated in FIG. 23 depending on the decision of the deployment layer by the deployment layer decision module 125.

S71: The speculation deployment area decision module 126 identifies a user (that is, target user) of the terminal 10 which moved.

S72: The speculation deployment area decision module 126 refers to the user information TI1 and acquires the cover area where the terminal 10 is located.

S73: The speculation deployment area decision module 126 refers to the stay history information for each user Ht3 and acquires the stay time "$t_s$" of the terminal 10 of the object user in the cover area where the terminal 10 is located of a decided deployment layer. The speculation deployment area decision module 126 acquires the stay time "$t_s$" as same as process S53 in FIG. 20.

S74: The speculation deployment area decision module 126 refers to the shift history information for each application Ht4 and acquires the shift time "$d_m$" of the target application. The speculation deployment area decision module 126 acquires the shift time "$d_m$" as same as process S51 in FIG. 20.

S75: The speculation deployment area decision module 126 calculates speculation deployment range "r". The speculation deployment area decision module 126 calculates the speculation deployment range "r" according to formula (shift time "$d_m$"/stay time "$t_s$"*coefficient "k"). The coefficient "k" in the embodiment is a value "5". For example, the coefficient "k" is set according to inspection.

S76: The speculation deployment area decision module 126 lists speculation deployment areas based on the speculation deployment range "r" and stores the speculation deployment area in the user/application correspondence information TI4. The speculation deployment area decision module 126 decides a cover area, which is adjacent to the cover area where the terminal 10 is located and is located in the distance range of the speculation deployment range "r" among the cover areas belonging to a deployment layer, as a speculation deployment area.

In this way, the speculation deployment area decision module 126 decides the number of the adjacencies indicating the range of the domain that is next to the cover area (provision domain) of the server based on a ratio at the shift time for the stay time. And the speculation deployment area decision module 126 instructs a shift of the service information for the adjacent server that the domain corresponding to the adjacent number is a cover area.

Thereby, it is possible that the speculation deployment area decision module 126 decides the range of the cover area which is speculatively deployed the service information depending on the movement speed of the terminal 10. Therefore, it is possible to enlarge a cover area which is speculatively located when the terminal 10 moves fast. Thereby, it is possible to omit the shift processing when terminal 10 moved and to reduce the response waiting time. In this way, depending on the movement speed of terminal 10, it is possible to reduce a shift delay effectively.

(Processing of Deployment Instruction Making Module 127)

Figure 24:
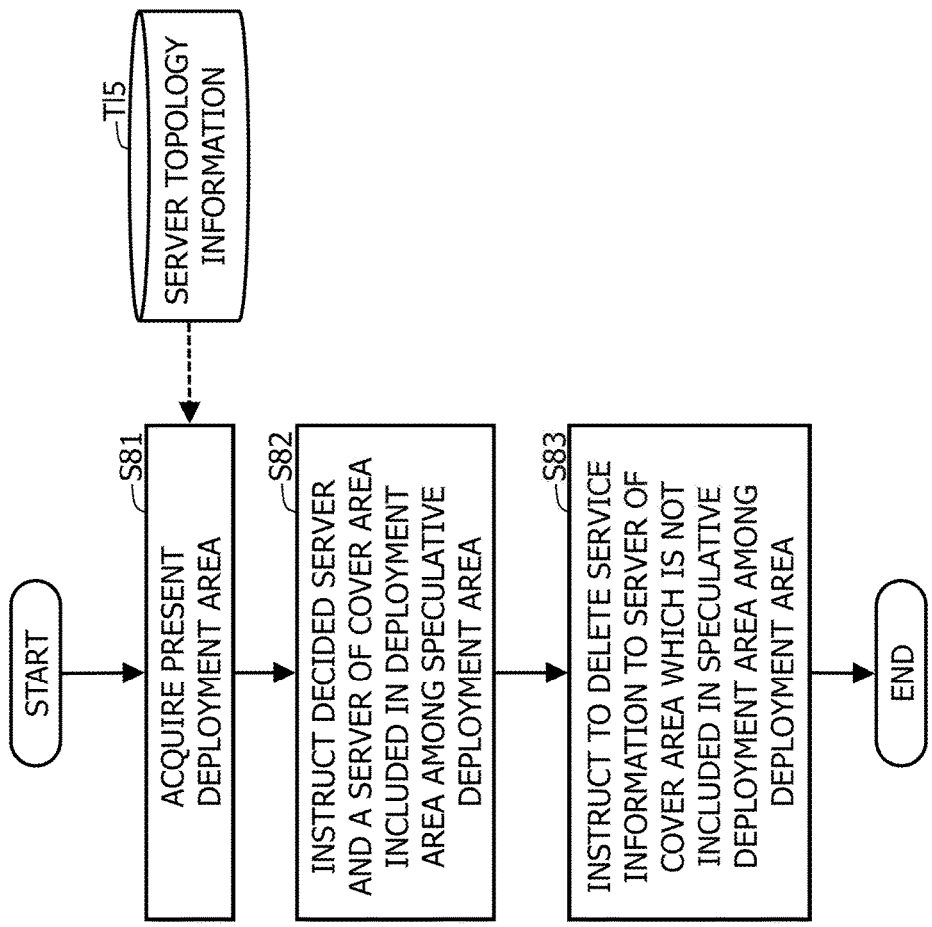
FIG. 24 is a diagram of flow chart explaining processing of deployment instruction making module 127 which was explained in FIG. 6.

FIG. 24 is a diagram of flow chart explaining processing of deployment instruction making module 127 which was explained in FIG. 6. The deployment instruction making module 127 starts the processing depicted in flow chart of FIG. 24 depending on the decision of the speculation deployment area by the speculation deployment area decision module 126.

S81: The deployment instruction making module 127 refers to the server topology information TI5 and acquires a cover area (also called as deployment area) where has been deployed a target application. In other words, the deployment instruction making module 127 acquires the information of the cover area of the server that the shift processing of the service information of the target application has been finished.

S82: The deployment instruction making module 127 instructs the shift (deployment) processing of the service information for the server corresponding to the cover area where the terminal 10 is located in the layer that the deployment layer decision module 125 decided. In addition, the deployment instruction making module 127 instructs the shift (deployment) processing of the service information to the server corresponding to the cover area that the deployment area does not include among the speculation deployment areas. For example, the server deletes the service information which is not used when there is not enough free space for the deployment of the service information.

S83: The deployment instruction making module 127 instructs a deletion of the service information to the server corresponding to the cover area that the speculation deployment area does not include among the deployment areas which is acquired in the process S81. For example, the server which received the deletion instruction performs un-installation of the application or deletion of the user state information.

Figure 25:
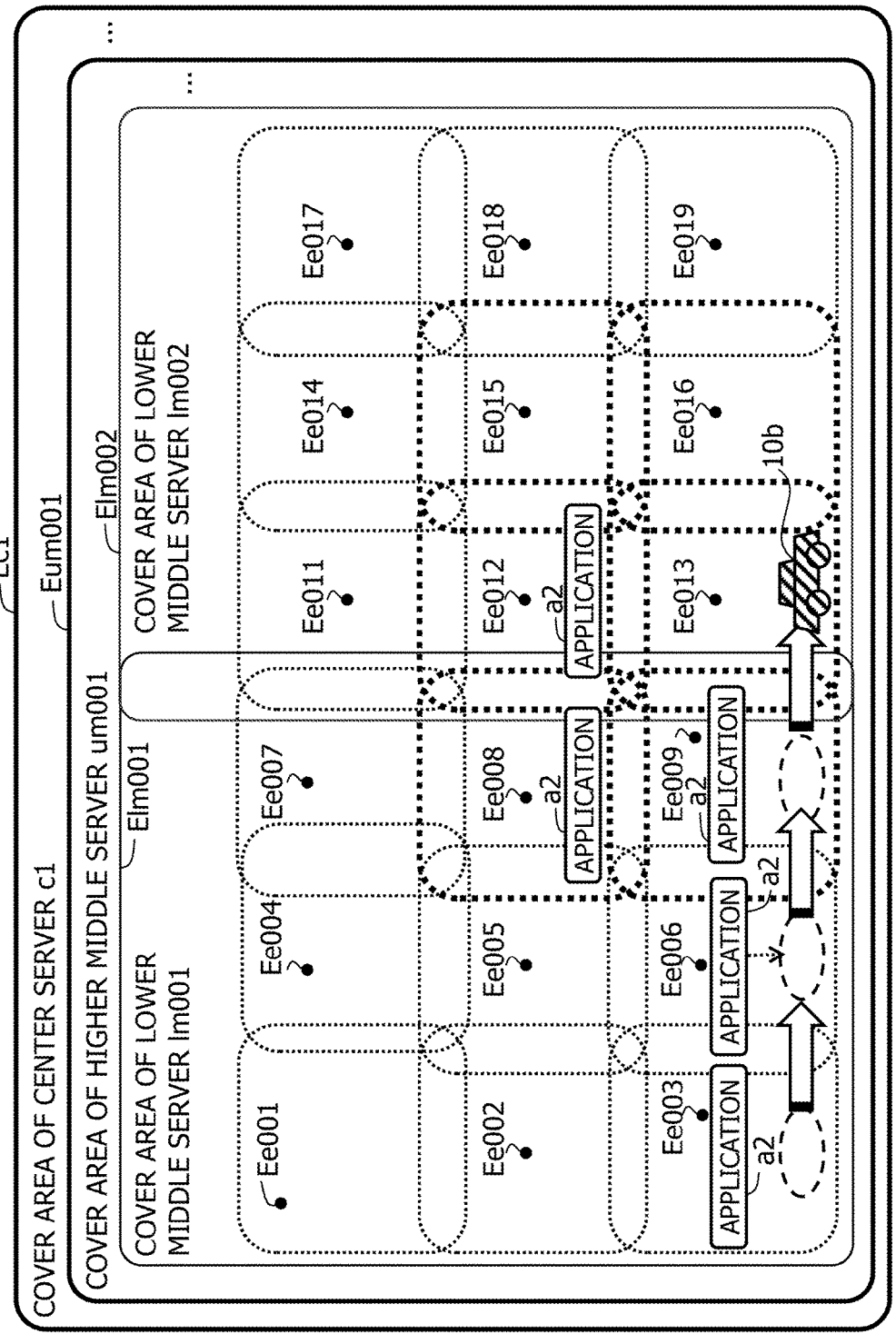
FIG. 25 is a diagram explaining example of the processing of the speculation deployment area decision module 126 and the deployment instruction making module 127 which are illustrated by flow chart of FIG. 23 and FIG. 24.

Then, according to FIG. 25 and FIG. 26, example of the processing of the speculation deployment area decision module 126 and the deployment instruction making module 127 which are illustrated by flow chart of FIG. 23 and FIG. 24.

Example

FIG. 25 is a diagram explaining example of the processing of the speculation deployment area decision module 126 and the deployment instruction making module 127 which are illustrated by flow chart of FIG. 23 and FIG. 24. In FIG. 25, same elements as elements represented in FIG. 2 are indicated by same sign in FIG. 2.

FIG. 25 exemplifies a case that the terminal 10b moves and enters the cover area "Ee013". The user ID "u2" uses the terminal 10b and uses the application of the application ID "a2".

The deployment layer decision module 125, as same as an example of FIG. 21, according to the flow chart of FIG. 19 and FIG. 20, decides a deployment layer. In the example depicted in FIG. 25, the deployment layer decision module 125 decides an edge layer as a deployment layer.

Then, the speculation deployment area decision module 126 identifies the user ID "u2" (S71 of FIG. 23), refers to the user information TI1, and acquires the cover area "Ee013" where the terminal 10b is located (S72).

And the speculation deployment area decision module 126 refers to the stay history information for each user Ht3-2 of the user ID "u2" which is depicted in FIG. 9B and acquires the stay time "$t_s$" of the terminal 10 in the cover area "Ee013" (S73). The speculation deployment area decision module 126 acquires average time "13.3 min" ($\approx 40/3$) of the stay time of cover areas "Ee003", "Ee006" and "Ee009" of the edge layer as the stay time "$t_s$".

In addition, the speculation deployment area decision module 126 refers to the shift history information for each application Ht4-2 of the application ID "a2" depicted in FIG. 10B and acquires the shift time "$d_m$" of the application ID "a2" (S74).

According to the shift history information for each application Ht4-2 in FIG. 10B, the shift time from the edge server "e003" to the edge server "e006" is "00:04". The shift time from the edge server "e006" to the edge server "e009" is "00:03". Therefore, the speculation deployment area decision module 126 acquires average "3.5 min" of the shift times as the shift time "$d_m$".

The speculation deployment area decision module 126 calculates value "1.31" that is multiplied coefficient "5" by a ratio at the shift time "3.5 min" for the stay time "13.3 min", and rounds off the value which is calculated, and calculates the speculation deployment range "1".

Therefore, the speculation deployment area decision module 126 decides cover areas "Ee008", "Ee009", "Ee012", "Ee015" and "Ee016", which are adjacent to cover area "Ee013" for speculation deployment range "1", as a speculation deployment area. Thereby, it is possible to omit the shift processing when the terminal 10b moves to either of the speculation deployment area.

In addition, the speculation deployment area decision module 126 in the embodiment decides neighboring cover areas adjacent to the cover area "Ee013" as a speculation deployment area. But it is not a thing limited to this example. The speculation deployment area decision module 126 may detect a movement direction of the terminal 10b and decide only a cover area (for example, cover area "Ee016") that is next to the movement direction as a speculation deployment area.

FIG. 26 is a diagram indicating an example of server topology information TI5-2 in the example. According to the server topology information TI5-2 depicted in FIG. 26, the deployment area of the application ID "a2" are cover areas "Ee003", "Ee006", "Ee008", "Ee009" and "Ee0012".

Therefore, the deployment instruction making module 127 instructs the shift processing of the service information of the application ID "a2" for the server "e013" and the servers "e015" and "e016" of the cover area that is not included in the deployment area among the speculation deployment areas (S82 of FIG. 24). In addition, the deployment instruction making module 127 instructs the deletion of the service information of the application ID "a2" for the servers "e003" and "e006" of the cover area that is not included in the speculation deployment area among the deployment areas.

Then, according to FIG. 27, the details of the processing of user state information notification module 128 will be described.

[User State Information Notification Module 128]

Figure 27:
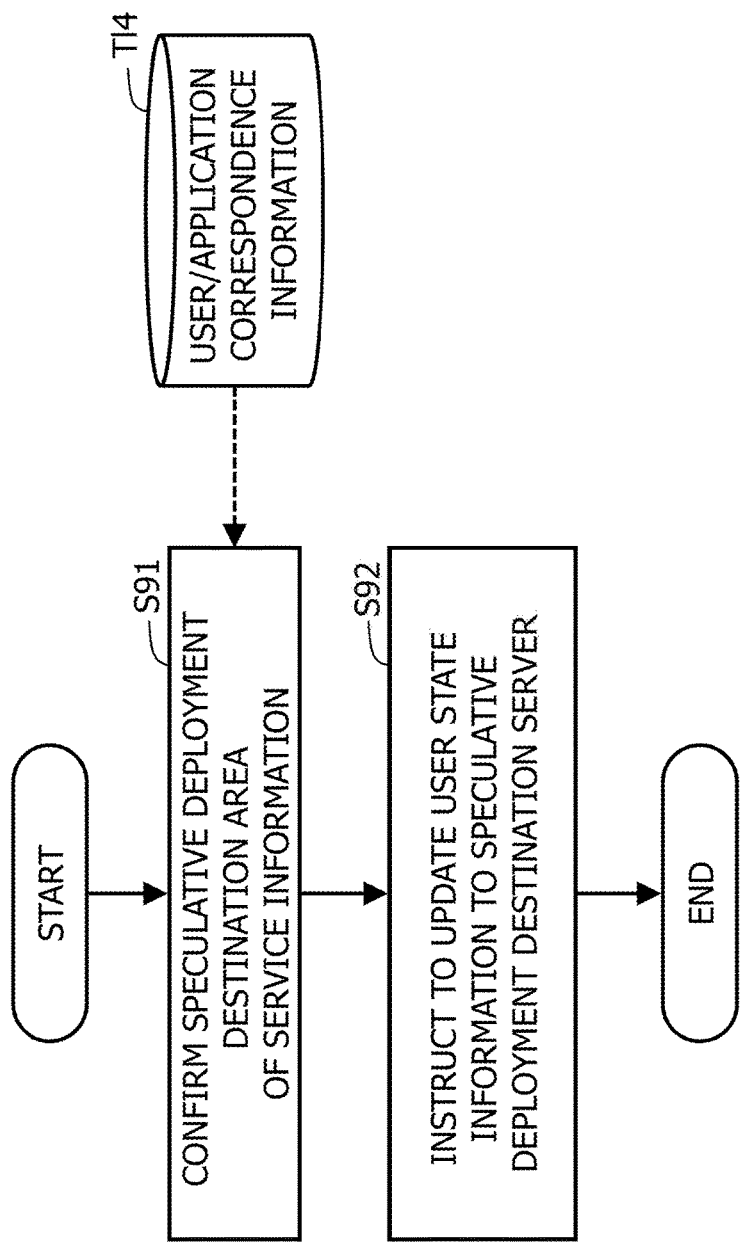
FIG. 27 is a diagram of flow chart explaining processing of user state information notification module 128 illustrated by FIG. 6.

FIG. 27 is a diagram of flow chart explaining processing of user state information notification module 128 illustrated by FIG. 6. The user state information notification module 128 orders update of the user state information for the server corresponding to the speculation deployment area regularly. For example, the user state information indicates user state information for the difference. Therefore, the user state information does not need to include a program of the application.

S91: When the user state information notification module 128 receives a notice of update of the user state information from the application, the user state information notification module 128 refers to the user/application correspondence information TI4 which is depicted in FIG. 14 and acquires an area of speculation deployment destination of the target application. According to the embodiment of FIG. 25, the speculation deployment area is cover areas "Ee008", "Ee009", "Ee012", "Ee015" and "Ee016".

S92: The user state information notification module 128 orders the update processing of user state information for the server corresponding to the speculation deployment area. In other words, the user state information notification module 128 orders the update processing of the user state information that the edge server "e013" holds for the edge servers "e008", "e009", "e012", "e015" and "e016".

Then, according to FIG. 28, FIG. 29, an update example of the user state information will be explained.

[Update Example of User State Information]

Figure 28:
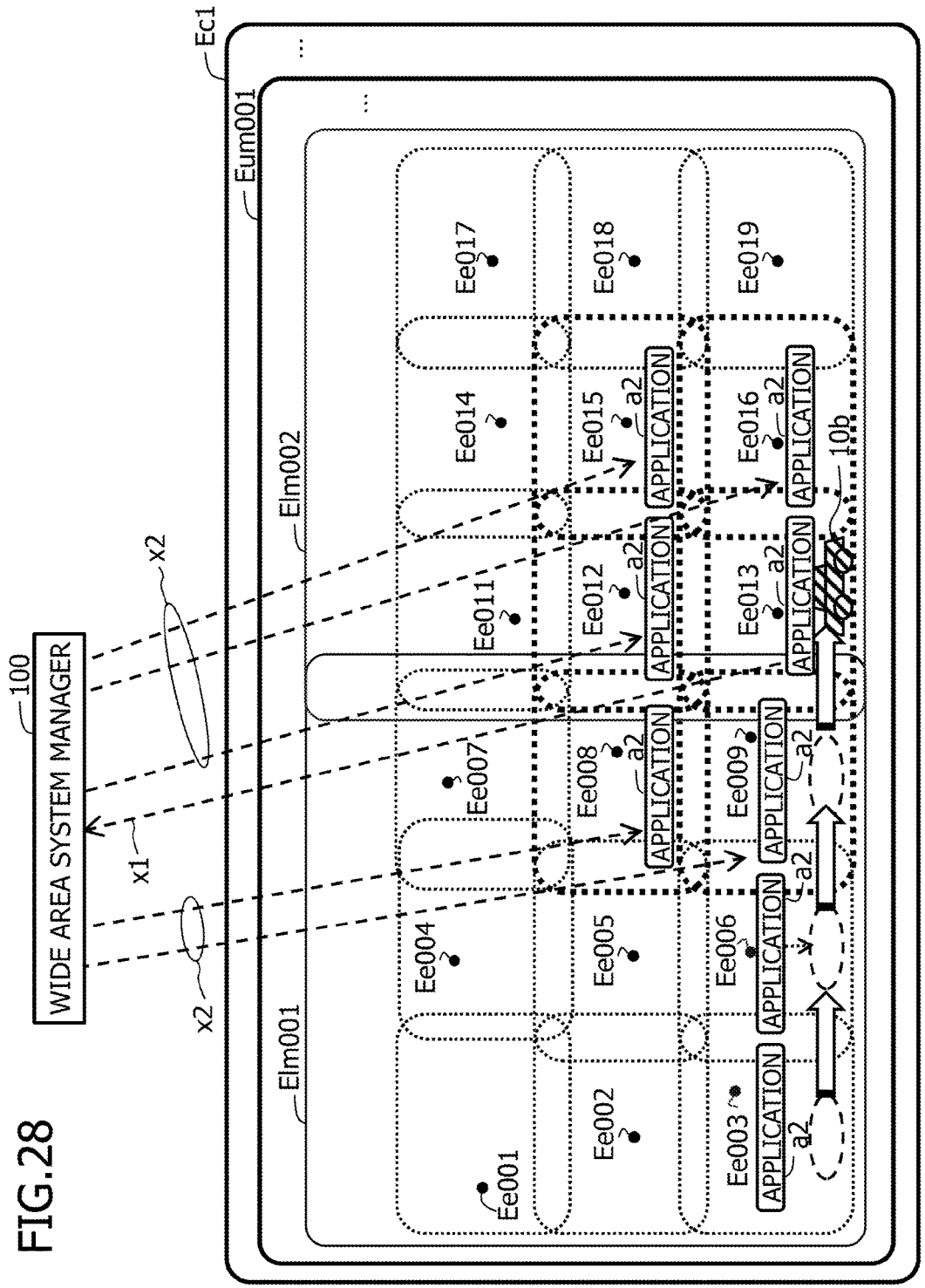
FIG. 28 is a diagram explaining a first update example of the user state information.

FIG. 28 is a diagram explaining a first update example of the user state information. FIG. 28 exemplifies a case to update the user state information to the server corresponding to the speculation deployment area via wide area system manager 100. It is possible to control load of the communication processing of the server (in the example of FIG. 29, the edge server "e003") which provides the service to the terminal 10 by updating the user state information via wide area system manager 100.

According to the example of FIG. 28, the user state information notification module 128 sends the user state information of application ID "a2" where the server "e013" holds to the wide area system manager 100 (X1). And the wide area system manager 100 sends the user state information which is received to the server of the speculation deployment area which is acquired with reference to the user/application correspondence information TI4 (X2).

FIG. 29 is a diagram explaining the second update example of the user information TI1. FIG. 29 exemplifies a case to transmit the user information to the server corresponding to the speculation deployment area without going by way of wide area system manager 100. It is possible to update the user state information quickly by sending the user state information to the server corresponding to the speculation deployment area directly.

According to the example of FIG. 29, the user state information notification module 128 sends the transmission request of the speculation deployment area of application ID "a2" to the wide area system manager 100 (X11). The wide area system manager 100 refers to the user/application correspondence information TI4, acquires a speculation deployment area and transmits to the server which provides the service (X11).

The user state information notification module 128 sends the user state information to the server corresponding to the speculation deployment area which is acquired from the wide area system manager 100.

Other Embodiment

In addition, the deployment destination identification program 120 in the embodiment is applicable about the case to decide a server among the plurality of servers which do not belong to a layer. For example, the deployment destination identification program 120 decides a layer to reduce response time based on the communication time for each server and a ratio at the shift time for the stay time of the cover area, when the cover area of plural servers repeats.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for deployment, the method comprising:
    acquiring a history of stay time of a terminal which stayed in a provision domain that each of plurality of information processing devices provides service from the each of plurality of the information processing devices that provides the service to the terminal;
    deciding, depending on a movement of said terminal, the information processing device, which provides the service to said terminal, among the plurality of information processing devices that said terminal is located in the provision domain, based on a communication time with the terminal and a ratio at a shift time, which needs for a shift of information about the service between the information processing devices, for the stay time of the provision domain said terminal is located that is acquired based on the history of the stay time, the deciding comprises:
    extracting the information processing device that the communication time satisfies a first standard value among the plurality of the information processing devices;
    first deciding, when the information processing device that the ratio at the shift time for the stay time satisfies a second standard value is detected among the information processing devices which are extracted, the information processing device that the communication time is smallest among the detected information processing devices that the ratio at the shift time for the stay time satisfies the second standard value; and
    second deciding, when the information processing device that the ration at the shift time for the stay time satisfies the second standard value is not detected, the information processing device that the ratio is smallest among the extracted information processing devices the ratio at the shift time for the stay time satisfies the second standard value.

2. The method according to claim 1, wherein the deciding comprises deciding the information processing device among the plurality of information processing devices including a first information processing device belonging to a first layer and a second information processing device belonging to a second layer,
    and wherein the provision domain of the first information processing device is wider than a provision domain of the second information processing device,
    and the communication time of the first information processing device is longer than a communication time of the second information processing device.

3. The method according to claim 1, wherein the method further comprises instructing said shift of the information about the service to the information processing device which is decided and adjacent information processing device that the provision domain is a domain that is next to the provision domain of the information processing device which is decided.

4. The method according to claim 3, wherein instructing comprises:
    calculating a number of the adjacencies indicating a range of the domain that is next to the provision domain of the information processing device based on the ratio; and
    ordering the shift for the adjacency information processing device that domain corresponding to the number of the adjacencies is the provision domain.

5. The method according to claim 1, wherein the acquiring comprises acquiring said history of the shift time from the each of the plurality of information processing devices, and the deciding further comprises acquiring the shift time based on the history of the shift time.

6. The method according to claim 1, wherein the information about the service comprises either one or both of a program that carries out the service and data that the program uses.

7. The method according to claim 1, wherein the shift indicates either one or both of installation of the program that carries out the service, a start of the program and copy of data that the program uses.

8. A non-transitory computer readable storage medium storing therein a deployment destination identification program that causes a computer to execute a process, the process comprising:
    acquiring a history of stay time of a terminal which stayed ire a provision domain that each of plurality of information processing devices provides service from the each of plurality of the information processing devices that provides the service to the terminal;
    deciding, depending on a movement of said terminal, the information processing device, which provides the service to said terminal, among the plurality of information processing devices that said terminal is located in the provision domain, based on a communication time with the terminal and a ratio at a shift time, which needs for a shift of information about the service between the information processing devices, for the stay time of the provision domain that said terminal is located that is acquired based on the history of the stay time, the deciding comprises:

extracting the information processing device that the communication time satisfies a first standard value among the plurality of the information processing devices;

first deciding, when the information processing device that the ratio at the shift time for the stay time satisfies a second standard value is detected among the information processing devices which are extracted, the information processing device that the communication time is smallest among the detected information processing devices that the ratio at the shift time for the stay time satisfies the second standard value; and second deciding, when the information processing device that the ratio at the shift time for the stay time satisfies the second standard value is not detected, the information processing device that the ratio is smallest among the extracted information processing devices the ratio at the shift time for the stay time satisfies the second standard value.

9. The storage medium according to claim 8, wherein the deciding comprises deciding the information processing device among the plurality of information processing devices including a first information processing device belonging to a first layer and a second information processing device belonging to a second layer, and wherein the provision domain of the first information processing device is wider than a provision domain of the second information processing device, and the communication time of the first information processing device is longer than a communication time of the second information processing device.

10. The storage medium according to claim 8, wherein the method further comprises instructing said shift of the information about the service to the information processing device which is decided and adjacent information processing device that the provision domain is a domain that is next to the provision domain of the information processing device which is decided.

11. The storage medium according to claim 10, wherein instructing comprises:

calculating a number of the adjacencies indicating a range of the domain that is next to the provision domain of the information processing device based on the ratio; and ordering the shift for the adjacency information processing device that domain corresponding to the number of the adjacencies is the provision domain.

12. The storage medium according to claim 8, wherein the acquiring comprises acquiring said history of the shift time from the each of the plurality of information processing devices, and the deciding further comprises acquiring the shift time based on the history of the shift time.

13. A deployment system comprising:

a terminal which connects to an information processing device through a communication;

a plurality of the information processing devices which provides a service to the terminal which is located in a provision domain; and an administration device, the administration device acquires a history of stay time of the terminal which stayed in the provision domain that each of the plurality of the information processing device provides service from the each of the plurality of the information processing devices, and decides, depending on a movement of said terminal, the information processing device, which provides the service to said terminal, among the plurality of information processing devices that said terminal is located in the provision domain, based on a communication time with the terminal and a ratio at a shift time, which needs for a shift of information about the service between the information processing devices, for the stay time of the provision domain that said terminal is located that is acquired based on the history of the stay time, extracts the information processing device that the communication time satisfies a first standard value among the plurality of the information processing devices, decides, when the information processing device that the ratio the shift time for the stay time satisfies a second standard value is detected among the information processing devices which are extracted, the information processing device that the communication time is smallest among the detected information processing devices that the ratio at the shift time for the stay time satisfies the second standard value, and decides, when the information processing device that the ratio at the shift time for the stay time satisfies the second standard value is not detected, the information processing device that the ratio is smallest among the extracted information processing devices the ratio at the shift time for the stay time satisfies the second standard value.

14. The deployment system according to claim 13, wherein the plurality of information processing devices comprises:

a first information processing device belonging to a first layer; and a second information processing device belonging to a second layer, and wherein the provision domain of the first information processing device is wider than a provision domain of the second information processing device, and the communication time of the first information processing device is longer than a communication time of the second information processing device.

15. The deployment system according to claim 13, wherein the administration device instructs said shift of the information about the service to the information processing device which is decided and adjacent information processing device that the provision domain is a domain that is next to the provision domain of the information processing device which is decided.

16. The deployment system according to claim 15, wherein administration device calculates a number of the adjacencies indicating a range of the domain that is next to the provision domain of the information processing device based on the ratio, and orders the shift for the adjacency information processing device that domain corresponding to the number of the adjacencies is the provision domain.

17. The deployment system according to claim 13, wherein the administration device acquires said history of the shift time from the each of the plurality of information processing devices, and acquires the shift time based on the history of the shift time.

\* \* \* \* \*